United States Patent
Segall et al.

(10) Patent No.: US 8,406,569 B2
(45) Date of Patent: Mar. 26, 2013

(54) METHODS AND SYSTEMS FOR ENHANCED DYNAMIC RANGE IMAGES AND VIDEO FROM MULTIPLE EXPOSURES

(75) Inventors: Christopher A. Segall, Camas, WA (US); Jie Zhao, Camas, WA (US); Ron Rubinstein, Haifa (IL)

(73) Assignee: Sharp Laboratories of America, Inc., Camas, WA (US)

( * ) Notice: Subject to any disclaimer, the term of this patent is extended or adjusted under 35 U.S.C. 154(b) by 895 days.

(21) Appl. No.: 12/356,074

(22) Filed: Jan. 19, 2009

(65) Prior Publication Data

US 2010/0183071 A1    Jul. 22, 2010

(51) Int. Cl.
*G06K 9/40* (2006.01)
*G06K 9/32* (2006.01)

(52) U.S. Cl. ........ 382/294; 382/254

(58) Field of Classification Search ........ 382/103, 382/106–107, 162, 168, 181, 191, 194, 203, 382/232, 254, 255, 260, 274, 276, 284–293, 382/299; 375/240.16, 240.12; 348/224.1, 348/242, 295, 229.1, 222.1, 446
See application file for complete search history.

(56) References Cited

U.S. PATENT DOCUMENTS

| | | | | |
|---|---|---|---|---|
| 5,828,793 A * | 10/1998 | Mann | | 382/284 |
| 6,343,156 B1 * | 1/2002 | Yamaguchi et al. | | 382/243 |
| 6,864,916 B1 * | 3/2005 | Nayar et al. | | 348/224.1 |
| 6,879,731 B2 * | 4/2005 | Kang et al. | | 382/274 |
| 7,084,905 B1 * | 8/2006 | Nayar et al. | | 348/222.1 |
| 7,239,750 B2 * | 7/2007 | Rising | | 382/190 |
| 7,623,683 B2 * | 11/2009 | Chen et al. | | 382/107 |
| 7,756,330 B2 * | 7/2010 | Border et al. | | 382/167 |
| 8,050,511 B2 * | 11/2011 | Daly et al. | | 382/274 |
| 2006/0215762 A1 | 9/2006 | Han | | |
| 2007/0076957 A1 | 4/2007 | Wang | | |
| 2007/0147504 A1 | 6/2007 | Wang | | |
| 2007/0242900 A1 * | 10/2007 | Chen et al. | | 382/294 |
| 2008/0056376 A1 | 3/2008 | Bjontegaard | | |
| 2008/0094472 A1 | 4/2008 | Ayer | | |
| 2008/0218635 A1 | 9/2008 | Tsuruoka | | |
| 2009/0097772 A1 * | 4/2009 | Zhao et al. | | 382/263 |

FOREIGN PATENT DOCUMENTS

| | | |
|---|---|---|
| JP | 2007-142670 A | 6/2007 |
| JP | 2007-201985 | 8/2007 |
| JP | 2009-224901 | 10/2009 |

OTHER PUBLICATIONS

Rubinstein et al, Fusion of Differently Exposed Images, http://www.cs.technion.ac.il/~ronrubin/Projects/fusion/report/fusion_report.pdf, Oct. 2004.*

Rovid et al, High Dynamic Range Image Based on Multiple Exposure Time Synthetization, Acta Polytechnica Hungarica vol. 4, No. 1, 2007.*

(Continued)

*Primary Examiner* — Andrae S Allison
(74) *Attorney, Agent, or Firm* — Chernoff Vilhauer McClung & Stenzel, LLP

(57) ABSTRACT

Aspects of the present invention relate to systems and methods for video coding and decoding. Some aspects relate to coding and decoding of enhanced dynamic range video sequences based on a series of low-dynamic-range (LDR) frames, captured at a first exposure configuration, that are multi-plexed with a series of enhancement frames that are captured at a second exposure configuration.

5 Claims, 7 Drawing Sheets

OTHER PUBLICATIONS

Petrovi et al, Gradient-Based Multiresolution Image Fusion, IEEE Transactions on Image Processing, vol. 13, No. 2, Feb. 2004.*

Rad A., Meylan L., Vandewalle P., Süsstrunk S.: Multidimensional image enhancement from a set of unregistered differently exposed images. In Proc. IS&T/SPIE Electronic Imaging: Computational Imaging V (2007), vol. 6498. 3.*

Burt et al "The Laplacian Pyramid As a Compact Image Code," IEEE Transactions on Communications, vol. Com-31, No. 4, Apr. 1983.*

International Application No. PCT/JP 2010/050864 International Search Report, 2010.

Japanese Office Action, dated Sep. 24, 2012, for Japanese Patent App. No. 2011-545996, Sharp Kabushiki Kaisha, 3 pp.

English Translation of Japanese Office Action, dated Sep. 24, 2012, for Japanese Patent App. No. 2011-545996, Sharp Kabushiki Kaisha, 3 pp.

* cited by examiner

METHODS AND SYSTEMS FOR ENHANCED DYNAMIC RANGE IMAGES AND VIDEO FROM MULTIPLE EXPOSURES

FIELD OF THE INVENTION

Some embodiments of the present invention comprise methods and systems for capturing enhanced dynamic range images and video with sensors that are not capable of capturing the enhanced dynamic range with a single image capture. Some embodiments also relate to coding and decoding of video sequences.

BRIEF DESCRIPTION OF THE SEVERAL DRAWINGS

DETAILED DESCRIPTION OF EXEMPLARY EMBODIMENTS

Figure 1:
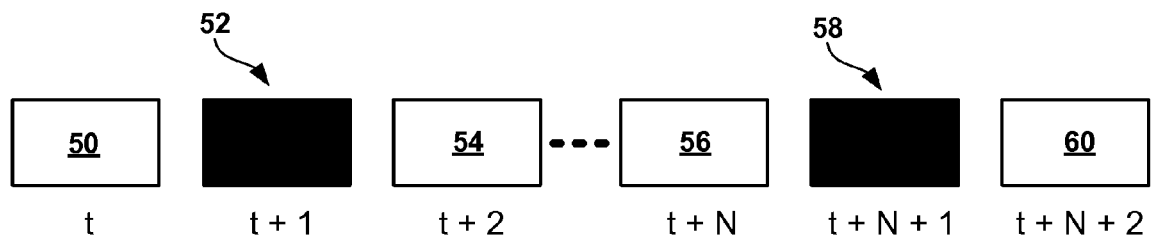
FIG. 1 is a diagram showing an exemplary series of reference frames and enhancement frames.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Embodiments of the present invention comprise systems and methods for capturing enhanced dynamic range video using a capture device that may comprise a low-quality, low frame-rate and/or low dynamic range sensor. The LDR camera may incorporate a simple controller which replaces a small subset of the auto-exposure frames with enhancement frames, which are differently exposed so as to capture the information which is saturated in the base sequence. The temporal resolution of the enhancement frames may be relatively low (for instance, around 1 FPS); their exposure may be determined in real time by a controller, which may activate or deactivate their capture based on the amount of saturation in the auto-exposure frames.

In some embodiments, the low temporal frequency of the enhancement frames allows the original auto-exposure sequence to be recovered with negligible visible quality degradation, by discarding the enhancement frames and performing a simple time interpolation, or another process, to fill-in the missing frames. At the same time, a fusion process described hereafter may be employed to fuse the auto-exposure frames with the enhancement data, producing a richer enhanced dynamic range (EDR) output. These systems and methods may be readily applied to still images as well, by capturing one or more enhancement frames alongside the default auto-exposure, either manually or via an automated process.

Some embodiments of the present invention address the task of producing enhanced dynamic range video from low-quality, low frame-rate devices. These embodiments differ from other models in that utilize a base reference sequence, interleaved with a lower-frame-rate enhancement sequence. These embodiments may output a sequence which is similar and is of no lesser quality than the reference sequence, while utilizing the added information offered by the enhancement frames.

An advantage of some embodiments is the ability to abort fusion and revert to the reference sequence when registration fails. The existence of a reference sequence also assists in maintaining temporal illumination consistency, which could become an issue when fusing frames with varying exposure. Some embodiments may also comprise a robust registration process and a reliable object motion detector, described in more detail below.

In some embodiments, physical accuracy is not one of the goals and the core of the fusion process may be based on a multi-scale decomposition which allows accumulation of the detail from all images. Some embodiments employ a novel treatment of boundary conditions, which emerge due to the global motion between the frames. Standard pyramid construction algorithms typically employ simple boundary handling techniques, such as symmetric padding, along the image borders; these methods are difficult to extend to the case where the defined region is not rectangular, and in any event, may cause disturbing artifacts when applied in the interior of a frame. Section 4.3.1 describes a method for computing pyramid representations for images which include undefined regions.

In some embodiments of the present invention, a tone-mapping method is used to post-process the fusion result. Since the output of a multi-sensor fusion technique will usually result in an extended dynamic range, typical fusion methods linearly compress the result to adapt it to an LDR monitor. This process, however, involves decreasing the contrast of the result. Section 4.4.1 describes a simple method to compress the range of such an image with less contrast loss.

Some embodiments of the present invention may also comprise a generalized mis-registration detector, aimed at suppressing fusion when object motion, registration errors, or other phenomena occur. The motion detector, discussed in section 4.2, may be based on simple local image statistics and does not require a large number of frames to operate. It is robust to exposure changes, and may operate over many scales to eliminate phenomena from medium-sized object motion to fine aliasing artifacts.

2. Algorithm Overview

Embodiments of the present invention typically receive input in the form of a sequence of auto-exposure frames (A-frames) 50, 54, 56 & 60, periodically replaced by differently exposed enhancement frames (E-frames) 52 & 58; see FIG. 1. The sequence of images may be low-resolution and compressed, possibly with complex camera movement and object motion. These systems and methods typically comprise two basic phases: registration and fusion. The registration phase may comprise global motion estimation, image warping and interpolation as well as other methods. Its goal is to transform the interleaved or multiplexed sequence of auto- and enhancement exposures to a sequence of registered frame-sets, where each frame-set corresponds to a specific point in time and may comprise an auto-exposure frame and one or more aligned enhancement frames. The fusion phase performs the fusion process, which may result in outputting an EDR sequence. The fusion may be performed at each time point individually, and may comprise a mismatch detector which may restrict or exclude areas containing local motion and other registration errors from the fusion process.

Figure 2A:
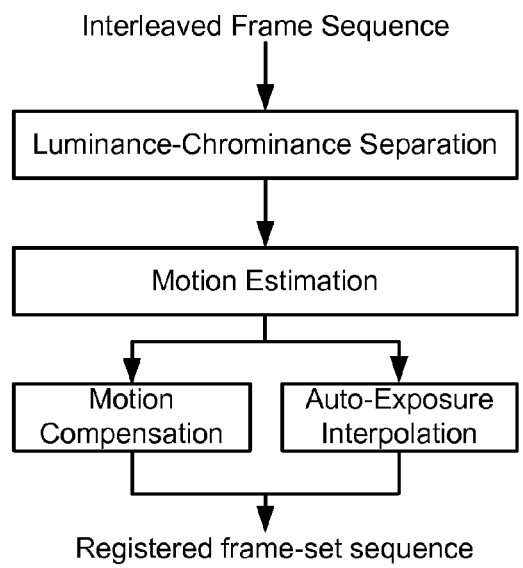
FIG. 2A is a diagram showing an exemplary registration phase.
Figure 2B:
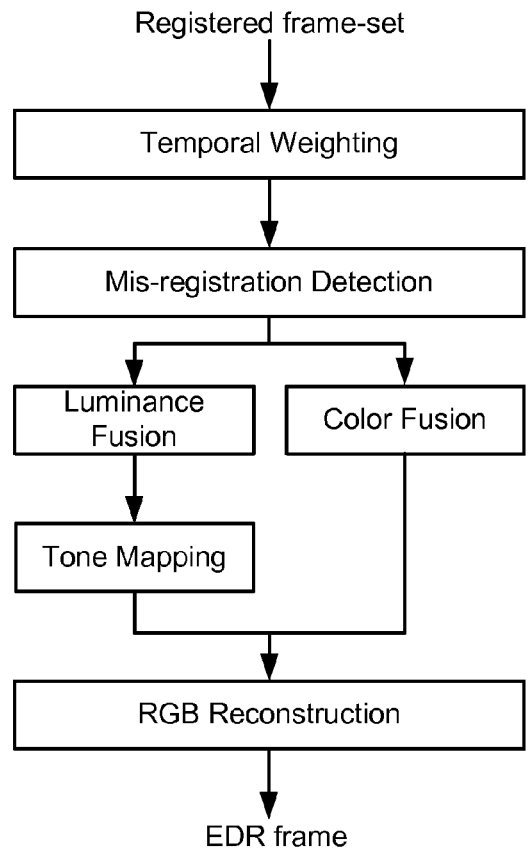
FIG. 2B is a diagram showing an exemplary fusion phase.

The two phases of the algorithm are summarized in FIGS. 2A and 2B. FIG. 2A outlines the pre-processing and registration phase, and FIG. 2B outlines the fusion phase. In some embodiments, the system is designed such that each of these parts is independent. The key advantage to this is that each part may be modified and fine-tuned individually—specifically, one may replace the motion estimation technique, such as one described in this application with another technique. Such a change would only affect the system to the degree that a more accurate estimation process would produce less mis-registration, and consequently gain more detail.

The registration phase (FIG. 2A) may begin with a related sequence of A- and E-frames as in FIG. 1. The frames may be converted to a luminance-chrominance color space to allow separate handling of intensity and color; in some embodiments, the L*a*b* color space produces good results. In some embodiments, motion estimation may then be performed on the luminance channels, aligning each A-frame with its two surrounding E-frames. The motion estimations may be used to warp the two E-frames to the coordinate system of the A-frame, which produces a frame-set of three frames. In parallel, the motion estimations are used to fill-in the missing auto-exposures which were dropped in favor of E-frames. This fill-in process may be achieved by temporally interpolating each missing frame from its two surrounding A-frames and the captured E-frame.

Figure 3:
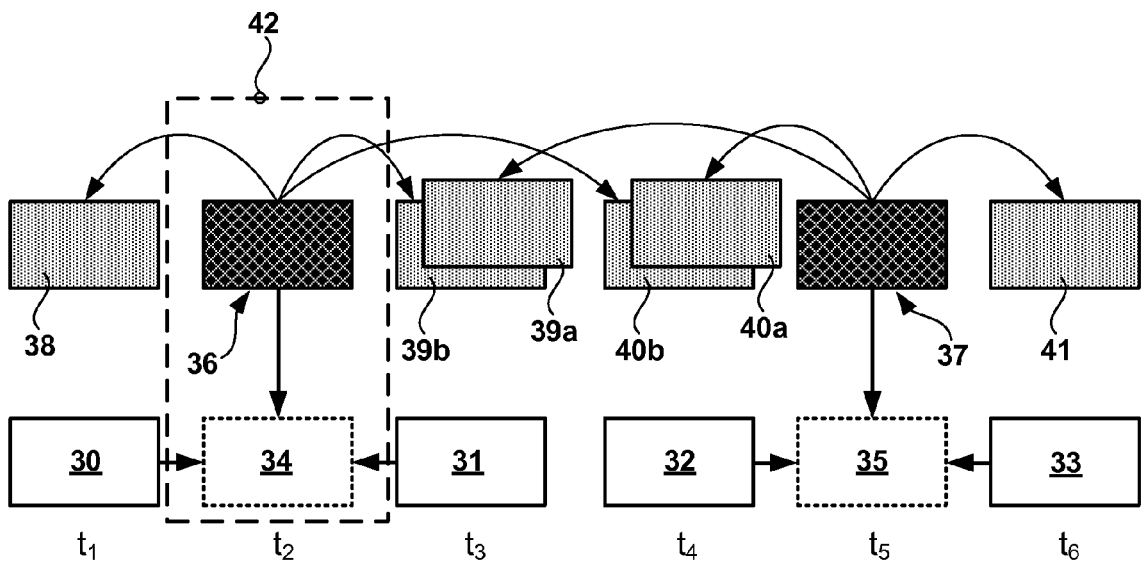
FIG. 3 is a diagram showing the relationships between captured reference frames, interpolated reference frames, enhancement frames and warped enhancement frames.

The first phase results in a series of frame-sets, one for each point in time (see FIG. 3). Each frame-set may comprise either a captured or an interpolated auto-exposure frame, and one or more aligned enhancement frames. We refer to the auto-exposure frames in these frame sets—both captured and interpolated—as the reference frames, since these are the frames which become default frames for display when no fusion is applied. The term enhancement frames is used to refer to both the captured E-frames and their warped versions. In FIG. 3, blank frames 30-33 with a solid outline represent captured reference frames while blank frames with a dotted outline 34-35 represent reference frames created by interpolation. Shaded frames 36 & 37 represent captured enhancement frames and lighter shaded frames 38-41 represent warped enhancement frames. Each vertical column of frames (e.g., 42) represents a frame set for a single point in time.

An exemplary fusion phase of an algorithm embodiment, illustrated in FIG. 2B, aims to fuse each frame-set to a single EDR frame in a temporally consistent manner. It begins with a single reference frame and one or more aligned enhancement frames, and we note that, due to global motion, each enhancement frame may only cover part of the reference frame. In some embodiments, the fusion process begins by assigning a weight value, between 0 and 1, to each of the enhancement frames. These weight values reflect the temporal distance between the corresponding enhancement frame and the reference frame. These weights are later used in various parts of the algorithm to facilitate temporal consistency. In some embodiments, the frames are then fed to a mis-registration detector, which compares them and identifies the locations where they do not sufficiently match. Such regions are marked as mismatches and may be excluded from the fusion or processed differently.

Given the mis-match maps, the core of the fusion process may take place. In an exemplary embodiment, the luminance channel may be fused using a band-pass Laplacian pyramid decomposition which accumulates information in all scales. The color channels, which require less accuracy, may be fused using a simpler single-scale confidence-based method. In some cases, the fused luminance values commonly extend beyond the valid range of intensities, which may be resolved using a simple intensity compression technique. The final luminance and color channels may be recombined, and converted to RGB for display purposes.

3. Registration Phase

3.1 Motion Estimation

In an exemplary embodiment, a simple 2-D projective global motion model may be used between the frames. Since the frame alignment must be highly accurate to avoid introduction of double edges and other artifacts, and must also be stable under exposure change, a two-stage technique may be used. The first stage is a feature-based alignment, which provides robustness to exposure change and moderate noise. The second stage is an iterative refinement method which uses the output of the first stage as initialization, and delivers the accuracy required by the fusion process. To reduce computational complexity, large frames may be resized prior to motion estimation.

In some embodiments, the global motion estimations may be performed only between consecutive frames in the related sequence. This increases the stability of the process since the 2-D projective motion model is more accurate for smaller camera movements. Once these estimations are available for all pairs, we can (approximately) align any two frames in the sequence by accumulating the sequential motions between them.

3.1.1 Feature-Based Motion Estimation

Given two (possibly differently exposed) frames, the feature-based motion detector may use SIFT feature matching to produce a dense point correspondence between the two frames. Since the correspondence may have a large number of outliers when the frames are of low quality (as is the case for low-cost sensors), RANSAC outlier rejection may be used to identify a set of inlier matches. The 2-D projective motion may be estimated from the inlier set using a Maximum-Likelihood estimation process.

3.1.2 Iterative Motion Refinement

In an exemplary embodiment, the proposed motion estimation provided by the feature-based process may be refined using an iterative multi-scale Lucas-Kanade-type method.

The method attempts to minimize the point-wise error between the two images, $\|I_1-I_2\|_F^2$, using a first-order approximation which linearizes the penalty function and leads to an iterative solver. Coarse-to-fine refinement may be employed to accelerate the process and accommodate larger motions.

Since this method is based on point-wise error, exposure compensation may be applied when using it to align differently-exposed images. Simple histogram specification may be used to accomplish this task, matching the histogram of the enhancement frame to that of the reference. In some embodiments, a more general motion model may be assumed—such as a hierarchical 2-D homography model. This may be beneficial to the performance of the method.

3.2 Motion Compensation

Once the motion estimates are determined, warping may be used to align the enhancement and auto-exposure frames and create the frame-sets to be fused. In an exemplary embodiment, bi-cubic interpolation, which balances complexity and quality, may be used. We have found simpler bi-linear interpolation to produce inferior results. Pixels in the warped result which are undefined may be marked by undefined numbers.

3.3 Auto-Exposure Interpolation

Whenever an E-frame is captured, we lose the auto-exposure frame at that time point. To compensate for this, we interpolate this frame using its two neighboring A-frames as well as the captured E-frame.

3.3.1 Method

An exemplary interpolation method is relatively straightforward. We begin by warping the two neighboring A-frames to the current coordinate system using the known motion estimates. The warped frames are then averaged. Pixels which are only covered by one of the A-frames are copied as-is. Finally, in some embodiments, if any pixels remain undefined (those not covered by any of the A-frames), we fill-in these pixels using the enhancement frame, after applying exposure-compensation to this frame as described next.

3.3.2 Exposure Compensation for Color Images

Some embodiments may comprise exposure compensation. Given two differently-exposed images, exposure compensation (also known as radiometric alignment when intensity images are involved) aims to modify the values of one of the images so that it mimics the exposure conditions of the other.

In some embodiments involving intensity images, exposure compensation can be done via histogram specification, i.e. applying a monotonic function to the intensities of one of the images so that its histogram resembles that of the other.

When color images are involved, the above process may be used to calibrate the luminance channels of the two images. As to color, these channels would theoretically be identical in both images; however in practice this is not the case, due to a combination of limited sensor sensitivity, quantization effects, and the limits of the RGB cube. In some embodiments, we therefore apply color correction as follows.

In some embodiments, we may model the color transform relating the two images using an affine model, $$(u_1,v_1)^T \approx A \cdot (u_0,v_0)^T + b, \qquad (1)$$

where $(u_0,v_0)$ and $(u_1,v_1)$ are color values in the source and target images, respectively, $A \in \mathbb{R}^{2\times 2}$, and $b \in \mathbb{R}^2$. We note that this model is heuristic and not physically accurate, however in practice it provides good results. The parameters of the affine model can be estimated via linear regression. Assuming the two frames are roughly aligned, we consider each pair of corresponding pixels as a sample for the regression process, and perform a robust estimation with outlier rejection for the model parameters. In some embodiments, complexity may be reduced by limiting the number of samples used for estimation.

4. Fusion Phase

In some embodiments, the fusion process accepts as input a single frame-set, comprising a reference frame and one or more enhancement frames, and outputs a fused EDR frame. The fusion method also takes as input the indices of the frames in the set, to allow it to establish the temporal distances between them. We now describe the various steps of the fusion process.

4.1 Temporal Weighting

The fusion process may begin by assigning a temporal weight value, in the range [0,1], to each of the enhancement frames in the frame-set. The weight of an enhancement frame is determined by its temporal distance from the reference, and is later used in various parts of the algorithm to facilitate temporal consistency.

In some embodiments, the weights may be assigned according to the following rules. When the frame-set includes only one enhancement frame, this frame is always assigned a weight of 1. When the frame-set includes two enhancement frames, the nearer one is assigned a weight of 1, while the farther one is assigned a lower weight, which is linear in its temporal distance from the reference. To formalize this, we denote the indices of the three frames in the set by $i_1, k_1, k_2$ where $i_1$ is the index of the A-frame, $k_1, k_2$ are the indices of the E-frames (respectively), and $k_1 < i_1 < k_2$. The weight of the farther frame is now given by $$w = w_{max} \cdot \frac{2|k_{far} - i_1|}{k_2 - k_1}, \qquad (2)$$

where $k_{far} \in \{k_1,k_2\}$ is the index of the farther frame, and $0 \le w_{max} \le 1$ is an optional constant representing the maximal weight assigned the farther frame.

In an exemplary embodiment, $w_{max}=0.6$. And, the Gaussian kernel $\sigma$ may be chosen relative to the size of the image; for an N×M image we use $\sigma=\min(N,M)/50$.

4.2 Mis-Registration Detection

The goal of the mis-registration detector is to map the regions in the enhancement frames which are not accurately enough aligned with the reference, and selectively exclude them from the fusion.

4.2.1 Alternative Embodiments

Some embodiments may perform mis-registration detection processes via comparing pairs of images by applying exposure compensation to one of the two and computing the error at each pixel. Pixels having an error above some predefined threshold are identified as suffering from local motion (except when either of these is saturated). A pixel suspected of object motion is filled-in using the least-saturated image at that location, possibly averaging it with other images whose intensity at that pixel does not significantly differ.

In some embodiments, local entropy may be used as an indicator of object motion. The idea is that the entropy of an image block is less affected by exposure changes, and is more related to the structure in that block. The proposed motion detector computes the entropy in a window around each pixel, and designates it as containing motion if this entropy differs too much between exposures. Once motion is detected, the pixel is filled-in using the least-saturated image, employing a smoothing procedure to avoid visible discontinuities.

In some embodiments, an exemplary estimation process begins by downscaling (as necessary) the two images to be aligned in order to reduce computational cost. In these embodiments, the estimation process produces a 3×3 homography matrix $H_0$ which relates the two downscaled images, such that for each pixel location $x_1=(x_1,y_1,1)$ in the first, the corresponding location in the second is $x_2 \sim Hx_1$, with $\sim$ denoting equality up to a factor. Translating this to a relation H between the two original images—assuming that pixel coordinates begin at (1,1)—is achieved by computing $$H = \begin{pmatrix} c & 0 & 1-c \\ 0 & c & 1-c \\ 0 & 0 & 1 \end{pmatrix}^{-1} H_0 \begin{pmatrix} c & 0 & 1-c \\ 0 & c & 1-c \\ 0 & 0 & 1 \end{pmatrix}, \quad (3)$$

where c<1 represents the downscaling factor.

4.2.2 Detecting Mis-Registration Between Different Exposures

In some embodiments, we assume two differently-exposed images of the same scene, globally aligned as accurately as possible. Sources of mis-registration in this case may be (a) constraints imposed by the assumed global motion model, (b) failure to estimate the optimal motion parameters within the assumed model, (c) aliasing artifacts in high-frequency regions which translate to incompatible patterns in the two frames, and (d) moving objects. These embodiments handle all these cases in the same way, detecting the incompatibility and excluding the affected region from the fusion process.

Figure 4:
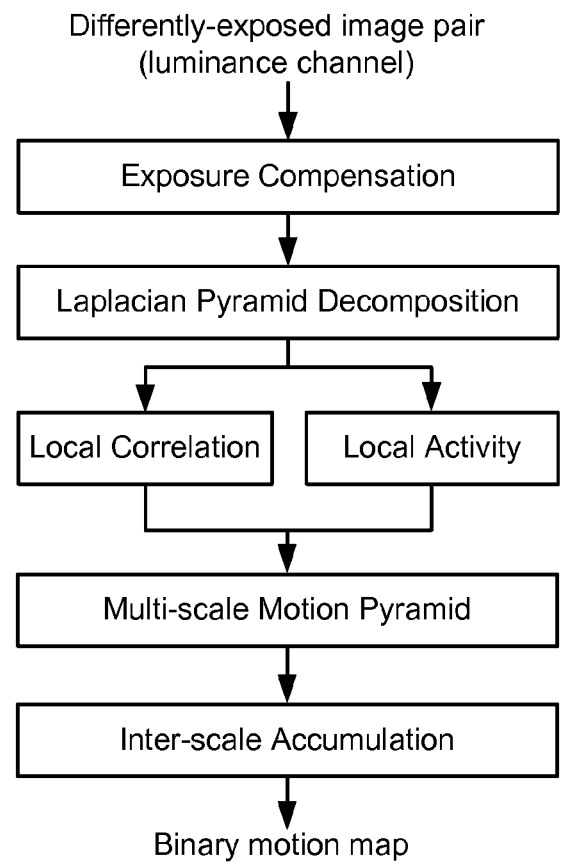
FIG. 4 is a diagram showing an exemplary mis-registration detection algorithm.

An exemplary embodiment for detecting mis-registration between differently exposed images is outlined in FIG. 4. These methods operate on the luminance channels of the two images. These processes may begin by applying exposure compensation to bring the enhancement frame closer to the reference frame. Next, we compute the Laplacian pyramid of the two images; we use the Laplacian pyramid as it reveals details in the image over many scales, spanning fine textures to large objects. A moving object will cause the two pyramids to differ in the corresponding scale, and possibly in finer scales as well.

For each band-pass level of the pyramid, we compute a mis-match map as follows. Let $p_{i,j,k}^1$ and $p_{i,j,k}^2$ be two corresponding pixels at location (i,j) and scale k of the two pyramids. In some embodiments, the fundamental value we use to quantify the correspondence between the two pixels is the normalized correlation between the two N×N windows surrounding them at the k-th scale. Formally, if we arrange the pixels in the N×N window surrounding $p_{i,j,k}^1$ as the vector $w_{i,j,k}^1$ and the pixels surrounding $p_{i,j,k}^2$ as the vector $w_{i,j,k}^2$, our correspondence measure as:

$$\rho_{i,j,k} = \frac{E\{(w_{i,j,k}^1 - \langle w_{i,j,k}^1 \rangle)(w_{i,j,k}^2 - \langle w_{i,j,k}^2 \rangle)\}}{\sqrt{E\{(w_{i,j,k}^1 - \langle w_{i,j,k}^1 \rangle)^2\}} \cdot \sqrt{E\{(w_{i,j,k}^2 - \langle w_{i,j,k}^2 \rangle)^2\}}} \quad (4)$$

$$= \frac{(w_{i,j,k}^1 - \langle w_{i,j,k}^1 \rangle)^T (w_{i,j,k}^2 - \langle w_{i,j,k}^2 \rangle)}{\|w_{i,j,k}^1 - \langle w_{i,j,k}^1 \rangle\|_2 \|w_{i,j,k}^2 - \langle w_{i,j,k}^2 \rangle\|_2}.$$

This exemplary correspondence measure takes values within [−1,1], and will be high (close to 1) only when the two pixels have similar edge patterns around them. As opposed to an entropy-based detector, for instance, this measure is sensitive to fine texture incompatibilities, which may ultimately result in fuzziness in the fused result. It similarly detects incompatible aliasing patterns and other non-coinciding edges. The measure is robust to exposure changes as it is not influenced by affine scaling.

Obviously, using $\rho_{i,j,k}$ as-is would effectively result in completely excluding all the areas where one of the frames actually lacks detail. Therefore, if either of the frames has very little detail in some neighborhood, we ignore the value of $\rho_{i,j,k}$ there and proceed with the fusion. To quantify the amount of activity around a pixel $p_{i,j,k}$, we use the total energy of its surrounding window in the Laplacian pyramid, given by $$\epsilon_{i,j,k} = \|w_{i,j,k}\|_2^2. \quad (5)$$

Since non-zero entries in the Laplacian pyramid correspond to features in the image, this measure directly quantifies the amount of detail surrounding $p_{i,j,k}$, in the respective scale.

Using (4) and (5), we can now define our mis-match detector. We begin with a multi-scale binary mis-match pyramid $m_{i,j,k}$ which we define as $$m_{i,j,k} = \{\rho_{i,j,k} < \hat{\rho}\} \text{ and } \{\epsilon_{i,j,k}^1 > \hat{\epsilon}_k\} \text{ and } \{\epsilon_{i,j,k}^2 > \hat{\epsilon}_k\}. \quad (6)$$

Here, $\hat{\rho}$ and $\{\hat{\epsilon}_k\}$ are some predefined thresholds. This map contains 1's wherever the correlation coefficient between the two frames is small, and both have significant enough activity. We allow different activity thresholds $\hat{\epsilon}_k$ for the different pyramid levels since these values are not normalized, and image derivatives tend to decrease substantially in coarser scales.

Given this pyramid, the final step of the algorithm is to combine its different levels and generate the final motion map. This is done by merging the levels of the pyramid in a manner resembling a Laplacian pyramid reconstruction process. Namely, we expand the coarsest level, add it to the level above it, and repeat until the entire pyramid has been processed. The value of each pixel in the accumulated result is roughly the number of scales in which that pixel has been found to contain motion; since we consider a single scale as sufficient to indicate motion, we output a binary map with 1's wherever the pixel value accumulated to above a threshold value.

4.2.3 Generating the Mis-Match Maps

We now describe how the method above may be utilized to form the complete mis-match detection system for the fusion process of some embodiments of the present invention. We assume that at every point in time we have a reference frame and either one or two enhancement frames. As can be seen in FIG. 3, at most time points we have two enhancement frames for each reference frame, which originate from the two surrounding E-frames in the sequence. In some points in time, however, we will have only one enhancement frame; this happens when an E-frame is captured, as well as at the first and last few frames of the sequence where only one temporally neighboring E-frame exists.

When only one enhancement frame is available, some embodiments may use the technique in 4.2.2 to construct a mis-match map for that enhancement frame, and conclude the process. When two enhancement frames are available, however, we may add a second step which compares these two enhancement frames among themselves, as the information they contribute may be incompatible when object motion or registration errors exist.

We compare the two enhancement frames by computing a simple pixel-wise error map between them and thresholding this map. As the two are similarly exposed, they should be practically identical except where object motion or registration errors exist (which we may identify as large entries in the error map). To allow detection of larger moving objects rather than only their boundaries, we repeat the computation over many scales in a Gaussian pyramid. We thus compute a binary motion pyramid by thresholding the difference between each pair of corresponding levels, and merge the resulting binary motion pyramid into a single motion map as in the case of differently-exposed images.

Finally, given the mis-match maps $m_{0,1}$ and $m_{0,2}$ between each of the enhancement frames and the reference frame, as well as the mis-match map $m_{1,2}$ between the two enhancement frames, we apply a binary OR between them to obtain the final mis-match maps for the enhancement frames:

$$m_1 = m_{0,1} \text{ or } m_{1,2}$$

$$m_2 = m_{0,2} \text{ or } m_{1,2} \quad (7)$$

4.2.4 Temporal Consistency

The exemplary motion detector described thus far has one major drawback—it is not temporally stable. Let us consider the sequence of frames $(E_1, \ldots I_1, E_2, I_2, \ldots, E_3)$ where $E_1$, $E_2$, $E_3$ are three consecutive E-frames and $I_1$, $I_2$ are two A-frames. We note that the frame-set at $I_1$ consists of $\{I_1, E_1, E_2\}$, the frame-set at $E_2$ consists of $\{\text{Interp}(I_1, I_2), E_2\}$, and the frame-set at $I_2$ consists of $\{I_2, E_2, E_3\}$. Applying the mis-match detection scheme just described, the frame $E_2$ will be masked by its mismatches with $E_1$ when fused with $I_1$, by its mismatches with $E_3$ when fused with $I_2$, and not masked at all when fused with the interpolated frame. This may cause a significant amount of visual disturbance around the E-frames.

To address this, we use a simple temporal adaptation to ensure that as we get closer to an E-frame, the influence of the farther E-frames gradually decreases. Recall that the mis-match map between two enhancement frames is computed by taking the pixel-wise difference between them and thresholding the result (this may actually be repeated for many scales, but we consider a single scale here for simplicity). We note that as the mis-match threshold increases, the detector becomes less sensitive to discrepancies between the two frames; specifically, if we assume image intensities within [0,1], then a threshold near 1 practically cancels mis-match detection. We can utilize this observation to temporally stabilize the process by gradually varying the threshold in time for each of the enhancement frames individually. Hence, given the difference map between two enhancement frames, we produce two different mis-match maps from it—using two different thresholds—one for each of the frames. By granting a larger threshold to the temporally closer frame, we reduce the influence of the farther frame on it. These thresholds can be smoothly varied in time to achieve a temporally consistent result. The two resulting mis-match maps are used to replace the map $m_{1,2}$ in (7), which was originally common to both frames.

4.2.5 Alternative Mis-Match Detection Embodiments

In some embodiments, there may be situations where the detection methods may fail to detect mis-registration. The method described in 4.2.2 will never detect a mis-match in regions where one of the images lacks detail, and will always assume the added information is missing from the other exposure. One alternative embodiment may replace local activity as an indicator of missing detail with saturation; thus, a mis-match is declared when the two images have low correlation and both are not saturated.

4.3 Fusing the Luminance Channels

In an exemplary embodiment, the core of the entire process is the fusion of a set of luminance channels to a single intensity image which accumulates the details from all the images. The process takes as input a set $\{I_1, E_1, M_1\}$ when only one enhancement frame is available, or a set $\{I_1, E_1, E_2, M_1, M_2\}$ when two enhancement frames are available, with $M_1$ and $M_2$ the two mis-match maps associated with the enhancement frames. The method is basically a three-step process:

1. Compute an adaptive Laplacian pyramid for each of the input frames
2. Merge the pyramids using pixel-wise maximization in each level
3. Retrieve the output image via reconstruction of the merged Laplacian pyramid In these embodiments, we selected the Laplacian pyramid for several reasons. First, it has been shown to be significantly more temporally stable than a critically-sampled Wavelet transform. At the same time, it was only found to be slightly less temporally stable than the shift-invariant Wavelet transform or the gradient pyramid, and this seems to be more relevant when fusing images from very different sources. The main motivation, however, for using the Laplacian pyramid is its simplicity, which allows us to design a variant of the transform for images with undefined regions.

4.3.1 Adaptive Image Pyramids

A. Gaussian and Laplacian Pyramids

The Gaussian and Laplacian pyramids of an image are widely-used structures for multi-scale and band-pass image analysis. The pyramids are constructed using the two basic operations shrink and expand. The shrink operation downscales an image by a factor of 2, and employs smoothing to minimize aliasing. The expand operation upscales an image by a factor of 2, employing smoothing as well to avoid introduction of high frequencies.

Given an intensity image I, its Gaussian pyramid $\mathcal{G} = \{G_1, G_2, \ldots, G_n\}$ is simply a series of downscaled versions of this image, with $G_1 = I$ and $G_{i+1} = \text{shrink}(G_i)$. The Gaussian pyramid is commonly used for multi-scale image processing tasks. The Laplacian pyramid $\mathcal{L} = \{L_1, L_2, \ldots, L_n\}$ of an image is essentially a band-pass decomposition of the image. It is computed from its Gaussian pyramid via $L_n = G_n$ and $L_{i-1} = G_{i-1} - \text{expand}(G_i)$. Each level of the Laplacian pyramid represents a different band of the image frequency range, with relatively low redundancy due to the downsampling of these levels.

B. Adaptive Gaussian Pyramids

The Gaussian and Laplacian pyramids are well-defined as long as the image is defined over its entire grid. In our case, while this is true for the reference frames, this will seldom be the case for the enhancement frames. The enhancement frames, which are warped versions of past or future E-frames, will typically have areas where they are undefined due to global motion.

The shrink operation used to construct the Gaussian pyramid involves smoothing the image and downsampling it. Smoothing is commonly implemented via a convolution with a small separable Gaussian kernel, with its weights normalized so they sum to 1. The downsampling involves discarding image samples and leaving only the odd (or even) indexed ones.

When some of the image samples are undefined, a difficulty arises in the smoothing process whenever the output pixel depends on values which are undefined. Recall that for an image $I = \{I_{i,j}\}$ and smoothing kernel $g = \{g_{i,j}\}$, the output $J = \{J_{k,l}\}$ is defined by $$J_{k,l} = \sum_{p,q \in \{-l \ldots l\}} g_{p,q} \cdot I_{k-p,l-q}. \quad (8)$$

When undefined values of I exist in this summation, one approach is to set the resulting $J_{k,l}$ to be undefined as well. However, as the coarser Gaussian pyramid levels are constructed, this will gradually eliminate an increasing number of pixels, causing the coarsest pyramid levels to cover only a fraction of the original image area. The Laplacian pyramid constructed from this will suffer from even further detail loss as each of its levels depends on two Gaussian pyramid levels, hence accumulating both their undefined regions. Ultimately, this results in missing details in the fused result, leading to sub-optimal performance.

In some embodiments, a possible way to overcome this is to redefine computation (8) so that only defined values are taken into account:

$$J_{k,l} = \frac{\sum_{(p,q)\in\Omega} \{g_{p,q} \cdot I_{k-p,l-q}\}}{\sum_{p,q\in\Omega} \{g_{p,q}\}}. \tag{9}$$

In this expression, $\Omega$ is a subset of $\{-1 \ldots 1\} \times \{-1 \ldots 1\}$ which corresponds to defined pixels in I. The normalization comes to ensure that the weights in this summation still add up to 1. Note that for output pixels which depend entirely on defined values, this computation is equivalent to the previous one. In this modified formulation, only pixels which depend entirely on undefined values (thus denominator=0) are tagged as undefined.

These embodiments essentially perform extrapolation of the image around its boundaries, assuming some form of continuous behavior of the image. Unfortunately, this extrapolation will not always be valid, and when it fails, it may introduce details which did not originally exist in the image, causing visible artifacts in the fused result. Accordingly, some embodiments may limit the use of (9) to output pixels which depend on some minimal number of defined input pixels, setting the rest to undefined numbers. Formally, we define a weight threshold $0 \leq \mu \leq 1$ such that:

$$J_{k,l} = \begin{cases} \dfrac{\sum_{(p,q)\in\Omega} \{g_{p,q} \cdot I_{k-p,l-q}\}}{\sum_{p,q\in\Omega} \{g_{p,q}\}} & \text{if } \sum_{p,q\in\Omega} \{g_{p,q}\} \geq \mu \\ NaN & \text{otherwise.} \end{cases} \tag{10}$$

We note that this formulation is a generalization of both (8) and (9): setting $\mu=1$ reproduces computation (8) (only outputs with all inputs defined are defined), while setting $\mu=0$ reproduces (9) (any output with a defined input is defined).

Unfortunately, we have found that every fixed choice of $\mu$ imposes significant drawbacks: lower values cause artifacts, while high values cause missing detail. To overcome this, some embodiments comprise a new adaptive construction process, which selects the value of $\mu$ for each pixel individually based on the contents of the image at that location. Therefore, we assign a unique threshold $\mu_{k,l}$ to each output pixel, leading to the process:

$$J_{k,l} = \begin{cases} \dfrac{\sum_{(p,q)\in\Omega} \{g_{p,q} \cdot I_{k-p,l-q}\}}{\sum_{p,q\in\Omega} \{g_{p,q}\}} & \text{if } \sum_{p,q\in\Omega} \{g_{p,q}\} \geq \mu_{k,l} \\ NaN & \text{otherwise.} \end{cases} \tag{11}$$

The basic idea now is to base the selection of $\mu_{k,l}$ on the amount of activity in the image around that pixel. We refer to this type of pyramid construction as an adaptive Gaussian pyramid. According to this approach, we first aim to compute a $\mu$-map for the image, which assigns a value of $\mu$ between 0 and 1 to each pixel, and once this map is determined, we apply computation (11) and proceed with the downsampling. It should be emphasized that using the modified computation (11) does not affect output pixels which depend entirely on defined inputs—disregarding their assigned value of $\mu_{k,l}$—since the total weight of their input pixels will always sum to 1. Specifically, this means that the Gaussian pyramid of an entirely defined image will remain unaltered.

An important observation in constructing the $\mu$-map is that the extrapolation operation is most accurate where the true image values on both sides of the border are similar. Therefore, the idea is to derive the value of $\mu_{k,l}$ from the local image gradient, considering only the component normal to the boundary; the stronger the normal component, the more likely it is that the extrapolation will fail, and therefore a higher value of $\mu$ should be imposed. However, the gradient along the border cannot be readily concluded from the enhancement frame itself. Therefore, some embodiments may estimate these gradients from the reference frame. The guiding assumption behind this is that if a strong enough gradient exists near the border, it will have some evidence in the reference frame.

In some embodiments, the actual computation of the $\mu$-map is as follows. Assume we are computing the i+1-th level of the adaptive Gaussian pyramid given its i-th level. To determine the correct $\mu$-map, we refer to the i-th level of the reference frame's Gaussian pyramid. Its gradients are computed by convolving it with the Sobel x and y derivatives kernels $k_x = (0.25, 0.5, 0.25)^T (-0.5, 0, 0.5)$ and $k_y = k_x^T$:

$$d_x^{ref} = I_{ref} * k_x$$

$$d_y^{ref} = I_{ref} * k_y \tag{12}$$

We continue by computing the normals to the boundary of the undefined region in the enhancement frame. For this, we define a binary map $I_{bound}$ containing 1's where the frame is defined and 0's elsewhere. We compute the gradients of this map using the same Sobel kernels, $$d_x^{bound} = I_{bound} * k_x$$

$$d_y^{bound} = I_{bound} * k_y \tag{13}$$

We normalize these gradients to obtain unit vectors:

$$(n_x^{bound}, n_y^{bound}) = \begin{cases} \dfrac{(d_x^{bound}, d_y^{bound})}{\|(d_x^{bound}, d_y^{bound})\|} & \text{if } \|(d_x^{bound}, d_y^{bound})\| > 0 \\ (0, 0) & \text{otherwise} \end{cases} \tag{14}$$

Finally, from (12) and (14) we can compute the normal component of the gradient via:

$$d_n = (d_x^{ref}, d_y^{ref})(n_x^{bound}, n_y^{bound})^T. \tag{15}$$

Given the values $d_n$, we now assign a µ value to each pixel according to the following rule:

$$\mu = \begin{cases} \mu_1 & |d_n| < t_l \\ \mu_2 & t_l \le |d_n| \le t_h \\ 1 & |d_n| > t_h \end{cases} \quad (16)$$

Here, $t_l$ and $t_h$ are two thresholds which distinguish between low and high derivatives, and $\mu_1 < \mu_2$ are two fixed values of µ. According to this rule, when the derivative is large we cancel extrapolation completely (µ=1), when the derivative is very low we allow strong extrapolation (µ=$\mu_1$, with $\mu_1$ close to 0), and when the derivative is in between, moderate extrapolation is performed (µ=$\mu_2$, where $\mu_2$~0.5).

C. Adaptive Laplacian Pyramids

Constructing a Laplacian pyramid for an image with undefined regions imposes similar difficulties as constructing a Gaussian pyramid, and we address these in a similar manner. In some embodiments, we may begin by constructing the adaptive Gaussian pyramid of the image, as described above. Once this pyramid is computed, computing the Laplacian pyramid from it involves a series of expand operations and image subtractions.

We define the subtraction operation to result in undefined numbers if any of the arguments is undefined. This ensures that if the expanded coarser Gaussian level covers more than the current Gaussian level due to extrapolation, this area will be eliminated in the subtraction process.

The expand operation implementation is straightforward, and very similar to the reduce operation in the adaptive Gaussian pyramid. The expand procedure begins by up-sampling the image, where we use undefined-number-filling rather than zero-filling to distinguish between defined and undefined pixels. Next, we multiply the values of the defined pixels by 4 to maintain brightness. Finally, we smooth the image using a small separable Gaussian kernel, taking only the defined pixels into account. We use the smoothing operation given in (10), which imposes a minimum weight on the defined pixels to avoid over-extrapolation.

As can be seen, for the expand operation we chose a simple fixed value of µ for the entire image, rather than an adaptive value. Indeed, we have found that as long as the adaptive Laplacian pyramid is based on an adaptive Gaussian pyramid, more delicate fine-tuning of µ was unnecessary. The only thing to note about the choice of µ in the expand operation is that its valid range should be [0,0.25] rather than [0,1], since the undefined-numbers-filling causes the maximal weight of the defined pixels in any window to be 0.25.

In an exemplary embodiment, the smoothing kernel is a 5×5 normalized approximation of a 2-D Gaussian with σ=1. The downsampling process leaves the upper-left pixel of the image and all pixels on the ×2 sub-sampled dyadic grid originating from that pixel; for an N×M image, this leads to a result of size ⌈N/2⌉×⌈M/2⌉. In this exemplary embodiment, we also use $t_l$=0.01, $t_h$=0.1, $\mu_1$=0.1, $\mu_2$=0.5.

4.3.2 Merging the Pyramids

A. Basic Process

Given the Laplacian pyramids of the reference and enhancement frames—$\mathcal{L}^{ref}$, $\mathcal{L}^1$, and $\mathcal{L}^2$, respectively, the basic idea is to perform a pixel-wise maximization between them, at all levels except the coarsest one, such that we accumulate the details from all frames in a single pyramid.

In the simple case where no mismatches exist and the temporal weights are ignored, the fusion process is summarized by the process described in Algorithm 1. In the algorithm description, the function maxabs performs maximization of its arguments disregarding sign, i.e., returns the maximal argument in absolute value times its sign.

B. Fusion With Multi-Scale Blend Pyramids

To accommodate mismatches, temporal weighting, and other phenomena, we generalize the basic process to allow a multi-scale blend pyramid to be assigned to each enhancement frame pyramid. This pyramid is of the same size as the enhancement frame's Laplacian pyramids, and assigns to each pixel in it a blend value within [0,1]. A blend value of 0 means that this pixel should not be considered in the maximization process (due to mis-match, for instance), while a blend value of 1 means that the pixel should be fully processed, as in the original formulation. We describe the procedure for computing the blend pyramid in the next section.

Assuming the blend pyramids are given, Algorithm 2 describes the modified fusion process which takes into account these pyramids. Note that for each pyramid level i, the output is initialized with the reference level. The enhancement frames are then processed sequentially; each enhancement value $L_i^k(x,y)$ is compared to the current contents of the output pyramid, and if it is larger, it is blended-in according to its associated weight An important property of this process is that it forms a direct generalization of Algorithm 1, since for any pyramid location where all assigned blend values are 1, the output of

---

Algorithm 1: Basic luminance fusion process.

Input: $\mathcal{L}^{ref}$ - reference Laplacian pyramid, $\mathcal{L}^1, \mathcal{L}^2$ - enhancement Laplacian pyramids
1. $L_n = L_n^{ref}$
2. $L_i(x,y)$ = maxabs $\{L_i^{ref}(x,y), L_i^1(x,y), L_i^2(x,y)\}$ Wherein the function maxabs performs maximization of its arguments disregarding sign, i.e., returns the maximal argument in absolute value times its sign

--- both algorithms will be the same. The idea behind this algorithm is that—as in the original formulation—we only consider new information when it is larger than the current output value, which is our indication that the frame contains information not currently represented in the output pyramid. Yet, when the associated blend value is less than one, we limit the effect of this new information, based on the blend value. This effectively results in a gradual fading of these details as the blend value decreases, which produces smoother fusion results.

C. Generating the Blend Pyramids

We now describe the process which is used to generate the enhancement frame blend pyramids. The process takes as input the adaptive Laplacian pyramids $\mathcal{L}^1$, $\mathcal{L}^2$ of the enhancement frames, their associated binary mis-match maps $M_1, M_2$, and the temporal weights $w_1, w_2$. The output of this process is a pair of blend pyramids $\mathcal{P}^1$, $\mathcal{P}^2$, the same size as $\mathcal{L}^1$ and $\mathcal{L}^2$, containing blend values between 0 and 1.

We initialize the blend pyramids by disregarding the mismatch maps altogether, and only taking into account the temporal weights. For every pixel location (i,j,k) in the pyramids, where (i,j) is the spatial location and k is the pyramid level, we first determine whether this location is covered by 0, 1, or 2 enhancement pixels (this depends on the regions where the two enhancement pyramids are defined). The blend values of the n-th enhancement frame are then determined according to the formula:

$$p_{i,j,k}^n \begin{cases} w_n & \text{if } def(L_{i,j,k}^n) \text{ and } def(L_{i,j,k}^{2-n}) \\ 1 & \text{if } def(L_{i,j,k}^n) \text{ and not } def(L_{i,j,k}^{2-n}), \\ 0 & \text{otherwise} \end{cases} \quad (17)$$

where def (x) is true when x is defined. Thus, in the typical case where both enhancement frames are defined at (i,j,k), the blend values are simply the associated temporal weights (note

---

Algorithm 2: Luminance fusion with blend pyramids.

Input: $\mathcal{L}^{ref}$ - reference Laplacian pyramid, $\mathcal{L}^1, \mathcal{L}^2$ - enhancement Laplacian pyramids,
$\mathcal{P}^1, \mathcal{P}^2$ - enhancement blend pyramids
1. $L_n = L_n^{ref}$
2. $L_i = L_i^{ref}$
3. for k = 1..2 do
   A. J = {(x,y) : $|L_i^k(x,y)| > |L_i^{ref}(x,y)|$}
   B. ∀ (x,y) ∈ J, $L_i(x,y) = (1 - \hat{P}_i^k(x,y)) \cdot L_i(x,y) + P_i^k(x,y) \cdot L_i^k(x,y)$
4. end for

--- that the weights are chosen such that at least one of them will be 1, see section 4.1). Frames which do not cover a location are always assigned a blend value of 0, and if a single enhancement frame covers some location then it is assigned a blend value of 1. This process ensures that for any pyramid location covered by at least one enhancement frame, one of the frames is assigned a blend value of 1.

Once each enhancement frame has an initial blend pyramid, its associated mis-match map is incorporated into the blend pyramid as follows. First, we compute a multi-scale representation $\mathcal{M}$ of the binary mis-match map m. The process is similar to a standard Gaussian pyramid construction, except that each reduce operation (which outputs a floating-point result) is followed by a binary thresholding operation, with a threshold of 0.5, which converts the output back to binary. The process is given by $$\mathcal{M}_1 = m, \quad \mathcal{M}_{k+1} = \{reduce(\mathcal{M}_k) > 0.5\}.$$

Next, each level of this binary pyramid is smoothed using a Gaussian kernel, with decreasing standard deviation values $\sigma_k = \sigma_0 \cdot 2^{-k}$ matching the size of each pyramid level:

$$\mathcal{M}_k = \mathcal{M}_k * \sigma_k.$$

To complete the computation, we pixel-wise multiply the initial blend pyramid computed in (17), with the smoothed mis-match pyramid, thus concluding the process.

In an exemplary embodiment, a mis-match detector for differently-exposed images may operate on 7×7 blocks. After applying exposure compensation to the enhancement frame, we compute an adaptive Laplacian pyramid for each of the frames, as described in section 4.3. For each pair of corresponding pixels in these pyramids, we compute the normalized correlation between their 7×7 neighborhoods, as defined in (4), using symmetric padding for border pixels. We also compute the local activity of each of the two 7×7 neighborhoods, as defined in (5). In this exemplary embodiment, the pixel is defined as having motion if the normalized correlation is below $\hat{\rho}=0.7$, and the local activity of both blocks is above $\hat{\epsilon}_k=0.8/2^k$, where k=1,2, . . . ,K is the level number, from fine to coarse. The choice of $\hat{\epsilon}_k$ assumes intensity values within [0,1]. Once the binary mis-match pyramid has been constructed, we convert it to double representation and apply a Laplacian rebuild procedure to accumulate the contributions of all levels. The final mis-match map is obtained by setting to 1 every pixel with a value>0.9 (motion detected in at least one scale).

In this exemplary embodiment, the mis-match detector for similarly exposed frames begins by computing an adaptive Gaussian pyramid for each of the frames. For each pair of corresponding pixels in these pyramids, we compute their difference (in absolute value) and compare it to the two pre-defined thresholds. This produces two binary mis-match pyramids, one for each of the frames, which are subsequently accumulated to two mis-match maps as described above. The thresholds we use assume luminance values within [0,1], and are given by $$T_1 = T_0 + \alpha \cdot (w_1 - w_2)$$

$$T_2 = T_0 + \alpha \cdot (w_2 - w_1) \quad (18)$$

where $T_0 = 0.08$ and $\alpha = 0.03$ are constants, and the values $w_1$, $w_2$ are the temporal weights, between 0 and 1, assigned to the two frames (section 4.1). Since the weight of the temporally closer frame will be larger, this frame will be assigned a larger threshold (above $T_0$) while the second frame will be assigned a lower threshold (below $T_0$).

4.3.3 Reconstructing the Output Luminance

The process described in section 4.3.2 results in a single merged Laplacian pyramid representing the output luminance channel. To obtain the fused result, we apply a standard Laplacian reconstruction process given by $I^n = L_n$ and $I^{k-1} = $ expand$(I^k) + L_{k-1}$; the output of the process is $I = I^1$. Note that since the Laplacian pyramid we are processing contains no undefined values, a standard expand operation can be used.

4.4 Tone Mapping and Intensity Compression

The fused luminance channel resulting from the Laplacian reconstruction process will typically contain values beyond the valid intensity range, depending on the amount of information the enhancement frames contributed to the saturated regions of the reference. In fact, when fusing two images using the basic fusion process, the theoretical output intensity range is [−1,2] for input images in the range [0,1]. In practice, we can expect the intensity range of the output to increase by about 50% over the input: when the enhancement frames are under-exposed the output range may be around [0,1.5], and when the enhancement frames are over-exposed the output range may be around [−0.5,1]. We refer to such an intensity range as medium dynamic range (MDR).

To produce a displayable result, we use intensity compression to map the medium dynamic range to a low dynamic range, as required by standard imaging devices. The main component of this process is a tone-mapping method, similar to HDR tone-mapping techniques, which compresses the intensity range in a spatially adaptive manner and applies stronger compression to the more saturated regions. The aim of this process is to reduce the dynamic range of the image, while keeping the mid-tones fixed so as to maintain the overall appearance of the reference frame. At the same time, the saturated regions are brought closer to the valid range, with minimal contrast loss. After applying the tone-mapping process, the result undergoes a simple additional intensity compression which ensures that the output only contains values within [0,1].

4.4.1 MDR Tone-Mapping

We use a tone-mapping procedure which is spatially adaptive so that out-of-range areas are compressed more than in-range areas. The idea is to compute a smooth compression map which is subtracted from the intensity image to produce the tone-mapped result. The key observation here is that as long as this compression map contains only low frequencies, the result will retain local contrast and will introduce negligible artifacts. In our implementation the compression map contains positive values only, and is computed such that it is larger for out-of-range areas, and smaller (or zero) for in-range areas.

The entire tone-mapping procedure is described in Algorithm 3. The process is described for an MDR image with a range of $[0,1+\delta]$, but a similar method can be described ---
Algorithm 3: MDR tone-mapping of an image with range $[0, 1 + \delta]$.

Input:  I - MDR image, $v \in [0,1]$ - saturation point, c - tone-mapping strength
1. $S = \max(I - v, 0)$
2. $\mathcal{G}$ = Gausspyr(S)
3. $\mathcal{L}$ = Laplacepyr(I)
4. $L_n = L_n - c \cdot G_n$
5. I = Laplacerebuild($\mathcal{L}$)

--- for an image with a range of $[-\delta,1]$. As can be seen, the basic tone-mapping process includes constructing a Laplacian pyramid of the image, applying a compression map to the coarsest level of this pyramid, and rebuilding the tone-mapped result. The idea is that by computing the compression map for the coarsest level of the pyramid, we ensure that it contains low-frequency components only.

The tone-mapping process accepts two parameters: a saturation point v and a strength coefficient c. We use v to define a saturation map S for the image, which contains zeros where the image is below v, or the saturation amount I−v where it is above v. We now reduce this map to the size of the coarsest Laplacian pyramid level via repeated reduce operations; in the algorithm description this is described as computing the Gaussian pyramid $\mathcal{G}$ of S, however in practical we only need the coarsest level of that pyramid, $G_n$.

The map $G_n$ is obviously zero in regions which are entirely below the saturation point, and it gradually increases in regions which are above the saturation point. The appealing property of this map is that its values are proportional both to the number of saturated pixels, and to the amount by which they are saturated. Clearly, in regions which contain many out-of-range values we will want to allow larger compression than in regions which are predominantly within range and contain only a few saturated pixels. Similarly, we need stronger compression when the values are largely out-of-range than when they are almost within range.

We use the map $G_n$ as the base for our compression map. For the actual compression, we may still want to multiply this by some strength factor c (typically near 1) which controls the amount of tone-mapping applied. A larger value compresses the out-of-range areas more than a smaller value.

4.4.2 Fixed Compression

Figure 5:
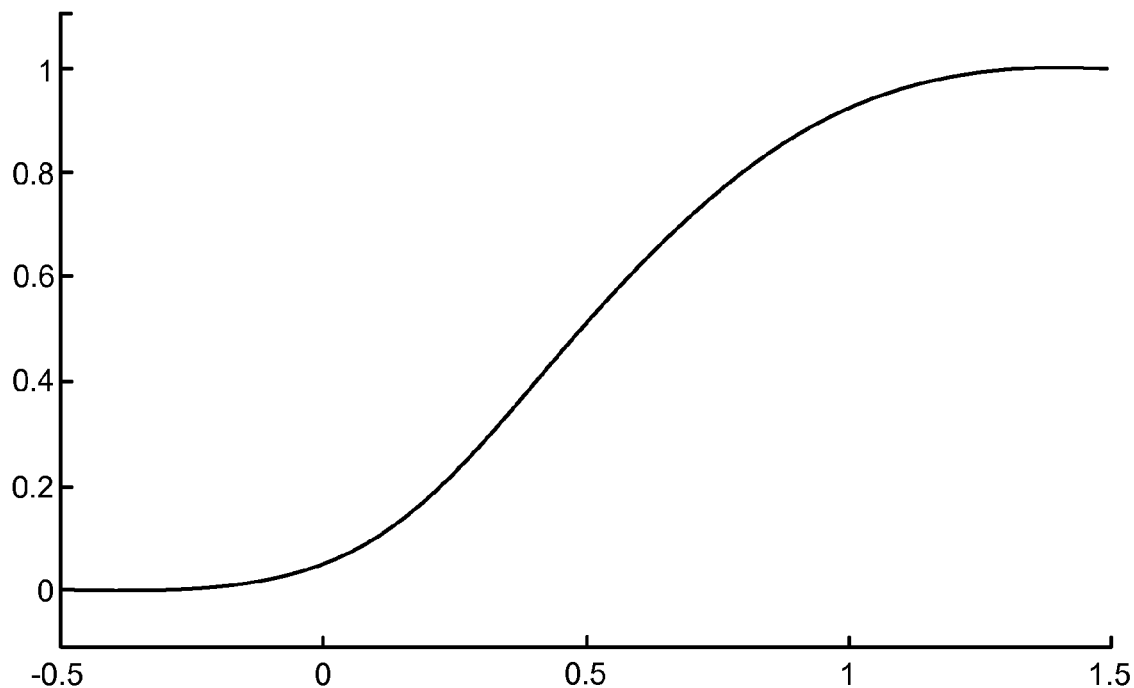
FIG. 5 is a plot of an exemplary tone mapping function.

The described tone-mapping process does not guarantee output values within $[0,1]$, and some out-of-range values will usually remain. Therefore, we supplement the adaptive tone-mapping process by a fixed global compression function, shown in FIG. 5. This compression function is designed to be identity (derivative=1) in the mid-tone range, and gradually increase its compression to the high- and low-tone ranges. Such a function cannot maintain contrast in the extreme areas, and will eliminate significant information if applied directly to the MDR fusion result. The adaptive tone-mapping process preceding this is intended to minimize this destructive effect by bringing the out-of-range areas closer to the mid-range zone.

The compression function takes two parameters: the mid-tone range $a=(a_{min},a_{max})$ where no compression is performed (output equals input), and the compression range $x=(x_{min}, x_{max})$ which is the range mapped one-to-one to $[0,1]$. Any value beyond the compression range will be saturated to 0 or to 1. The compression function is designed to be $C^1$-smooth, and is given by $$f(x) = \begin{cases} 0 & x < x_{min} \\ \alpha_1(x - a_{min})^3 + \beta_1(x - a_{min})^2 + x & x_{min} < x < a_{min} \\ x & a_{min} < x < a_{max} \\ \alpha_2(x - a_{max})^3 + \beta_2(x - a_{max})^2 + x & a_{max} < x < x_{max} \\ 1 & x > x_{max} \end{cases}$$

By construction, we have continuity of f and its derivative at $a_{min}$ and $a_{max}$. The constants $\alpha_1, \beta_1, \alpha_2, \beta_2$ are determined by imposing the continuity constraints on f and its derivative at $x_{min}$ and $x_{max}$, which lead to two linear equations for each pair of parameters.

It should be noted that the above compression function, while guaranteeing smoothness, does not guarantee monotonicity, which is a critical requirement from a compression function. Monotonicity is obtained, however, for many reasonable choices of a and x. To avoid excess complication, we keep these parameters fixed for all input sequences.

4.5 Fusing the Color Channels
4.5.1 Basic Process

Fusion of the color channels is performed directly on the finest scale. The basic idea is to take the chromaticity information at each pixel from the frame which is least saturated at that location, since we expect it to have the most reliable measurement. Quantitatively, we define the confidence at each pixel as the distance of its luminance from the mid-tone value:

$$\text{conf}(x,y) = 1 - |2 \cdot I(x,y) - 1|. \tag{19}$$

The confidence is highest (close to 1) for pixels with luminance near 0.5, and decreases to 0 as the luminance approaches saturation. Thus, we take the color information at each pixel from the frame with highest confidence, which should provide the most accurate information.

4.5.2 Color Fusion Maps

The above process works well in simple cases. However, one major drawback with it is that when different enhancement frames cover different regions of the reference, the proposed process will not ensure a smooth color transition between them if they have different color balances. Also, the process cannot accommodate mis-match maps, temporal weights, or any other phenomena.

To address this, we generalize the fusion process so it accepts a color fusion map associated with each enhancement frame. The color fusion map assigns a weight within $[0,1]$ to each pixel in the frame, which describes its contribution to the fused result. The color fusion map can represent different properties such as the degree of mis-match with the reference, the frame's temporal weight, and more. Specifically, to ensure smooth color transitions between different enhancement frames, we assign decreasing values to the color fusion map near the boundaries of the enhancement frame's defined region, whenever it overlaps with another enhancement frame.

We describe the construction of the color fusion maps in the next section. Given these maps, the fusion process is implemented as follows. Let $\text{conf}^0(x,y)$, $\text{conf}^1(x,y)$ and $\text{conf}^2(x,y)$ denote the saturation confidence maps, as defined in (19), of the reference frame and the two enhancement frames, respectively. Also, let $C^0(x,y)$, $C^1(x,y)$ and $C^2(x,y)$ be the associated color fusion maps, where we define $C^0(x,y)=1$ $\forall(x,y)$ in the case of the reference frame. Finally, let $\{a^k(x,y),b^k(x,y)\}$, $k \in \{0,1,2\}$ be the chromaticity channels of the reference and two enhancement frames.

To formulate the fused chromaticity $\{a(x,y),b(x,y)\}$ at some location $(x,y)$, we first sort the confidence values at that location in decreasing order, such that $\text{conf}^{i_0}(x,y) \geq \text{conf}^{i_1}(x,y) \geq \text{conf}^{i_2}(x,y)$, with $i_0, i_1, i_2 \in \{0,1,2\}$ the respective frame indices (note that in this we are generalizing the process of selecting the frame with maximum confidence, as discussed in the basic formulation 4.5.1). The fused result is now given as a recursive convex combination of the color inputs, with the linear weights taken from the color fusion maps:

$$a(x,y) = C^{i_0}a^{i_0} + (1-C^{i_0})(C^{i_1}a^{i_1} + (1-C^{i_1})a^{i_2})$$

$$b(x,y) = C^{i_0}b^{i_0} + (1-C^{i_0})(C^{i_1}b^{i_1} + (1-C^{i_1})b^{i_2}) \quad (20)$$

Note that the confidence values $\text{conf}^k(x,y)$ do not explicitly participate in the computation, however they play the vital role of determining the order of the terms in the summation (they determine the indices $i_0, i_1, i_2$). The computation itself can be easily explained: First, assume that $C^{i_0}=1$, which means that frame $i_0$—the least saturated frame at $(x,y)$—is assigned a color fusion weight of 1. In this case, the computation reduces to taking the color from this least saturated frame, since $(1-c^{i_0})=0$ and thus all remaining frames are ignored. Therefore, an important property of this process is that it reduces to the optimal (basic) process whenever the color fusion weights are all 1.

When $C^{i_0}<1$, we only partially use the color information from frame $i_0$. In the limit of $C^{i_0}=0$, we completely ignore this frame, even if its confidence is high—this could occur, for instance, when a mis-match is detected at that location. Finally, for $0<C^{i_0}<1$, computation (20) simply means that the fused result at $(x,y)$ is the recursive fusion of all frames except $i_0$, subsequently combined with the information from $i_0$ according to its associated weight.

Another desirable property of the described process is that it easily generalizes to an arbitrary number of frames. The process essentially begins with the color information from the least saturated frame, and incrementally adds color from the more saturated frames—stopping when it reaches the first frame with an associated color fusion weight of 1. All frames which are more saturated than this one will be excluded from the fusion, to avoid unnecessary degradation of the result.

4.5.3 Computation of the Color Fusion Maps

Computing the color fusion map of an enhancement frame begins with its smooth border map. Such a map contains zeros outside the frame's defined region and ones within its defined region, with a gradual transition from 0 to 1 on the inner side of its boundary. The transition from 0 to 1 extends a predefined distance. Note that it is important that this map be strictly zero beyond the defined area of the frame, so as not to introduce errors in the fusion process, and thus the smooth transition occurs entirely within the frame's defined region.

Computing this map can be done using the Euclidean distance transform, which accepts a binary map as input and outputs a map containing the Euclidean distance between each pixel and its nearest non-zero. The Euclidean distance transform can be efficiently computed in linear time, and using this transform, the computation of the smooth border map becomes straightforward, see Algorithm 4.

Once the smooth border maps of the enhancement frames have been computed, we normalize them so that at every location covered by at least one enhancement frame, the larger among the two maps has a value of 1. We do this by dividing the two border maps pixel-wise by the maximum of the two maps, wherever at least one of them is defined. This normalization process produces the initial color fusion maps for the enhancement frames, and ensures linear transitions between the enhancement frames in their regions of overlap.

The final color fusion maps are obtained from the initial color fusion maps, $C^1$ and $C^2$, and the mis-match maps $M^k$ computed in 4.2:

$$C^k = C^k \cdot (M^k * \sigma) \quad k=1,2$$

where * denoted convolution. In other words, the computation is a pixel-wise multiplication of the initial color fusion map with a Gaussian-blurred version of the mis-match map. We have found that blurring the mis-match map increases both the spatial and temporal smoothness of the fused result.

5. Image Capture and Coding 5.1 Introduction

These embodiments of the present invention address the problem of capturing high (or higher) dynamic range video with (i) current (LDR) sensor technology and, in some cases, (ii) power-constrained imaging platforms, e.g. camera-phones. Currently, the problem of high dynamic range acquisition is not well addressed for this environment. These embodiments comprise systems and methods that do not require a new (HDR) image sensor. Instead, the embodiments acquire multiple exposures. Some embodiments efficiently store/transmit the data so that significant calculations may be offloaded from the camera platform. Additionally, some of these embodiments provide an efficient representation of an acceptable video sequence that can be played back on legacy decoders.

5.2 Exemplary Embodiments

An exemplary embodiment may comprise the following elements:

1. A camera sensor module is initialized by a host processor, captures image data and transmits the image data to the processor. Here, the image data may undergo some processing, e.g. white balancing, de-mosaicing, gamma correction or conversion to a standard color space, within the camera sensor. Optionally, the camera sensor module transmits meta-data describing its configuration to the host processor.
2. The host processor compresses and stores the image data. The data is then stored or transmitted to a second device. Optionally, the meta-data is stored or transmitted to a second device.
3. The host processor continues to receive data from the sensor module, compresses and stores the image data, and optionally the meta-data is stored or transmitted to a second device.
4. Periodically, the host processor requests that the image sensor use an alternative exposure value (or an alternative set of values). The camera module transmits the resulting enhancement image data to the host processor.
5. The host processor compresses and transmits/stores the enhancement image data to the second device. Optionally, the host processor transmits/stores the meta-data describing the configuration of the image sensor to the second device. Optionally, the host processor transmits/stores a representation of the current frame at the original exposure value to the second device.
6. The host processor then requests that the image sensor return to a previous exposure value. The image sensor transmits the image data, and the process returns to Step #2 (above).

At the decoder, a legacy second device may ignore the enhancement information and reconstruct an image sequence corresponding to the default exposure or exposure method. However, decoders on advanced second devices may extract this additional enhancement information and utilize it for enhancing the dynamic range of the original scene.

An exemplary embodiment may also comprise the following aspects:

1. A system of interleaving multiple exposures in a single, coded video bit-stream.
2. A system of capturing multiple exposures on a mobile or LDR platform, transmitting the data in a backwards compatible manner, and using advanced decoding processes to reconstruct a higher dynamic range image sequence for display. Additionally, some embodiments may comprise the aspect of performing this higher dynamic range reconstruction on a second device that is more amenable for higher power processing.
3. The use of low temporal sampling of the alternate (enhancement) exposure values to reduce bit-rate and power consumption within the mobile device.
4. The capture and transmission of camera meta-data containing meta-data from an imaging sensor. Specifically, the capture and transmission of one or more of white balance, de-mosaicing, gamma correction, exposure values, gain values, automatic exposure methods, automatic gain methods, color space conversion methods and other parameters describing processing within a camera sensor module.
5. Systems and methods for efficient coding of a sequence containing different exposures. Additionally, some embodiments comprise efficient encoding so that only one exposure value is reconstructed by a legacy decoder.

5.3 System Description

Some embodiments of the present invention comprise a camera sensor module and acquisition system. These systems comprise a standard dynamic range imaging sensor and host processor or other, necessary control interface. Some embodiments of the present invention comprise an encoding system. This system is responsible for representing the image data efficiently. Additionally, this system is responsible for storing the image sequence so that enhancement exposures are not decodable and viewable by legacy decoders, while an image sequence corresponding to a single exposure value (or method) and with suitable quality is output by a legacy decoder. Some embodiments of the present invention comprise a high dynamic range reconstruction system that leverages the enhancement exposures to produce higher dynamic range images.

In this description, we consider the compression and representation of an image sequence containing sets of image frames corresponding to different exposure values or automatic exposure calculation methods. For example, the sequence of images appearing in FIG. 1 provides a representation of the signal input. In FIG. 1, a first series of frames 50, 54, 56 and 60 are captured using a first exposure configuration or exposure calculation method. Additionally, a second series of frames 52 and 58 may be captured using a second exposure configuration or exposure calculation method.

In some exemplary embodiment, an encoding system may begin by encoding the frames corresponding to a default (first) exposure value or exposure calculation method using a video coding system supported by legacy devices. Example legacy systems include H.264/AVC, MPEG-2 and MPEG-4 as well as others. The output of this process may be referred to as the legacy bit-stream 62, which is illustrated in FIG. 6.

Figure 6:
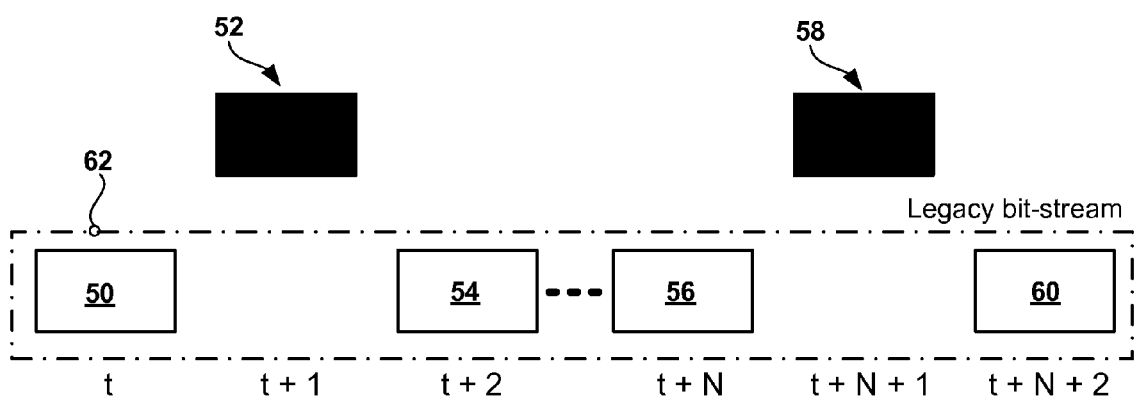
FIG. 6 is a diagram showing an exemplary legacy bitstream.
Figure 7:
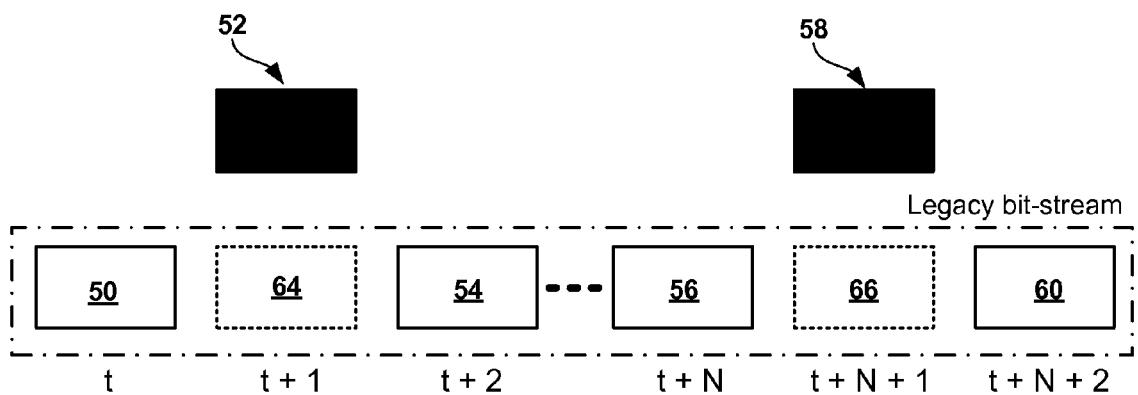
FIG. 7 is a diagram showing an exemplary temporal interpolation process and associated frames.

In FIG. 6, the legacy bit-stream 62 does not contain image data for time locations (e.g. t+1 and t+N+1) corresponding to the alternative (second) exposure. This is allowed in many video coding systems and decoders may optionally perform temporal interpolation to synthesize these frames. However, in alternative embodiments, this temporal interpolation process may be performed during encoding. In some embodiments, an encoding process that inserts a "skip frame" in the bit-stream at these time instances. A skip frame may be defined as a bit-stream instruction that copies the image intensity values from a previous time instance to a current time instance. Of course, other methods for temporal interpolation may also be used. These include the process of interpolating a frame and then coding it explicitly, as well as the process of using bit-stream information, e.g. motion vectors, coding modes, etc., from neighboring temporal frames to construct an interpolated frame. An exemplary encoding system incorporating temporal interpolation is shown in FIG. 7. Interpolated frames 64 and 66 correspond to the time slots when enhancement frames 52 and 58 were captured, respectively.

Having considered the encoding of the legacy bit-stream 62, we now consider the representation of the enhancement data 52 & 58. In some embodiments, the data is encoded so that it may be ignored by legacy decoders. This can be achieved by creating an enhancement bit-stream. In some embodiments, the enhancement and legacy bit-streams may then be interleaved using user-data markers, alternative NAL unit values or other methods known to those skilled-in-the-art. Alternatively, the bit-streams may be multi-plexed as separate bit-streams within a larger transport container. Of course, the bit-streams may also be transmitted or stored separately.

Figure 8:
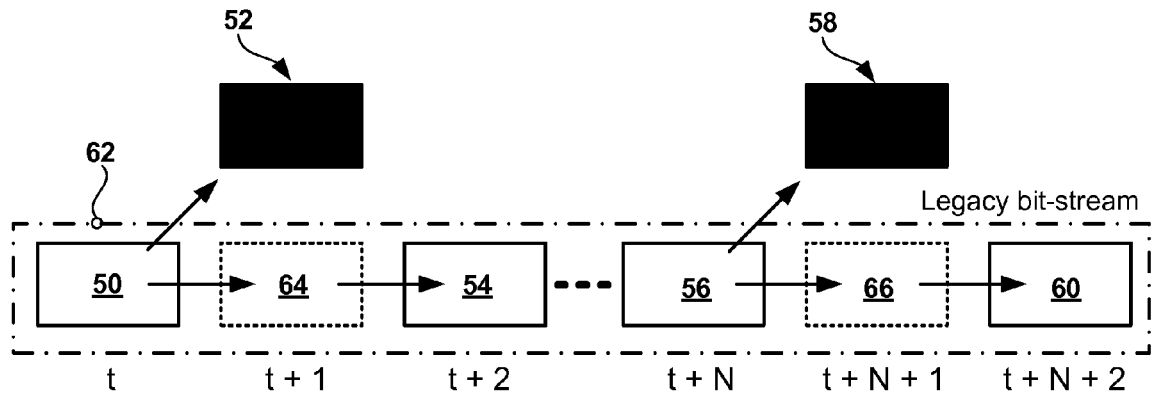
FIG. 8 is a diagram showing an exemplary prediction structure.
Figure 9:
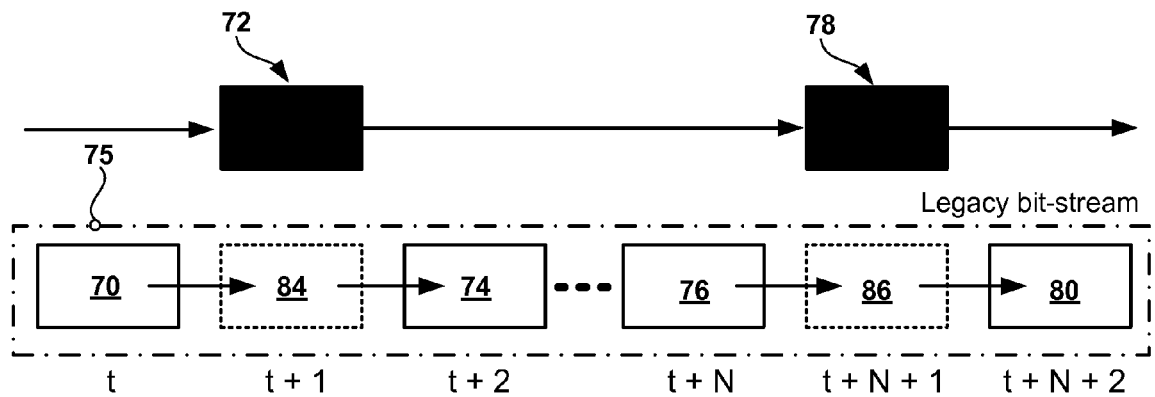
FIG. 9 is a diagram showing an exemplary alternative prediction structure.

Efficient coding of the enhancement layer data provides better performance. In some embodiments, we encode the enhancement frames without prediction from other time instances or the legacy bit-stream. Unfortunately, this is inefficient in terms of video coding efficiency. In a second set of embodiments, illustrated in FIG. 8, we encode the enhancement frames 52 & 58 using image frames 50 & 56 in the legacy bit-stream as reference frames. In a third set of embodiments, we encode the enhancement frames 72 & 78 using enhancement frames 72 & 78 and other enhancement frames (not shown) in the enhancement bit-stream as reference frames as shown in FIG. 9. Note the legacy bit stream 75 comprises the default exposure frames 70, 74, 76 & 80 as well as interpolated frames 84 & 86.

In further embodiments, both inter-frame and inter-bit-stream prediction may be used. In some of these embodiments, a mapping process that projects frames captured at one exposure value to frames captured at a second exposure value may be enabled. This technique comprises a process known as weighted prediction with other novel aspects that improve the encoding efficiency of weighted prediction methods. These embodiments, illustrated in FIG. 10, may use an exposure compensation process to predict or otherwise generate exposure compensated frames 102 & 108 from which enhancement frames 92 & 98 may be predicted. Other enhancement frames may also be used to predict 105 enhancement frames 92 & 98. Again, the legacy bit stream 95 comprises the default exposure frames 90, 94, 96 & 100 as well as interpolated frames 104 & 106.

Figure 10:
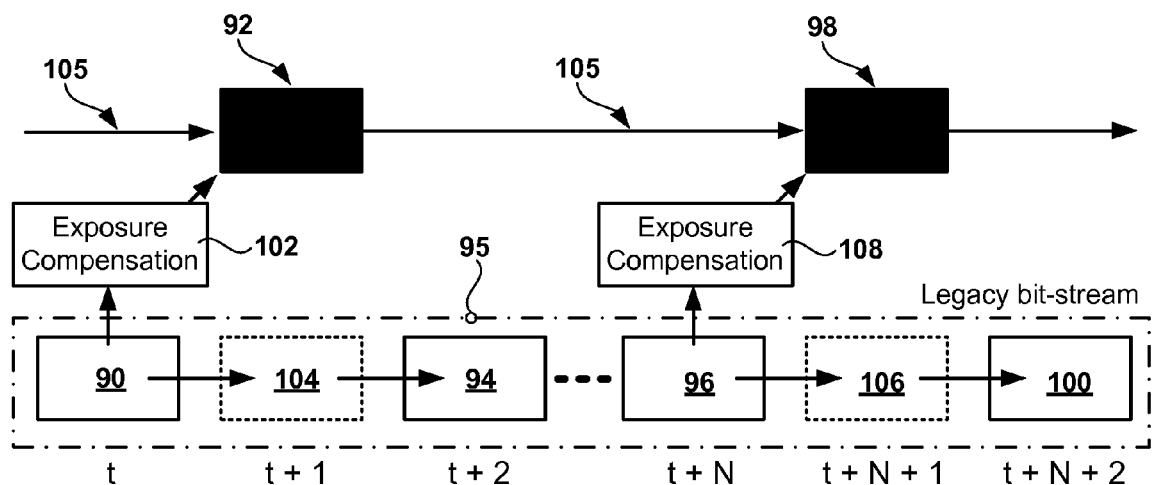
FIG. 10 is a diagram showing an exemplary prediction structure with exposure compensation.

Using these embodiments described in relation to FIG. 10, a legacy decoder may decode the legacy bit-stream 95 and output a video sequence corresponding to a first exposure value or method. A decoder able to decode the enhancement bit-stream may output a video sequence corresponding to the image sequence in FIG. 1. Some embodiments may comprise additional picture buffers for storing enhancement frames for future prediction. Additionally, in some embodiments, a decoder able to decode the enhancement bit-stream will not reconstruct the frames appearing in the legacy bit-stream that correspond to the time instances of enhancement frames.

6. Metadata-Based Embodiments

6.1 Introduction

Mobile video cameras, such as those in cell phones, typically have low dynamic range, and are not able to capture the full dynamic range of the real world. Consumers typically take videos in arbitrary and time varying lighting conditions, and this requires a camera to vary its exposure to compensate for the low dynamic range. These exposure variations can be useful for improving image quality. Additionally, these exposure variations can be useful for extracting larger dynamic range representations at a display device. Unfortunately though, these dynamic range variations reduce coding efficiency and result in low video quality under limited bandwidth. This ultimately degrades image quality and makes it infeasible to recover higher dynamic range representations of the image sequence.

Weighted prediction is an existing approach that can efficiently code sequence with exposure variations. Weighted prediction is an internal tool of a video codec. It works by scaling the reference frame and reducing the prediction error, and hence improving the video coding efficiency. However, weighted prediction has two significant drawbacks: (1) it not allowed in the baseline profiles of the video coding standards that are typically employed for mobile encoding and (2) the computational load for exploiting weighted prediction is typically high.

6.2 Summary

Embodiments of the present invention comprise a video coding system that introduces pre-processing and post-processing steps by utilizing camera sensor metadata to reduce the prediction error among frames, and hence improve the coding efficiency. Unlike weighted prediction, these methods work for any profiles of a video codec.

Some exemplary embodiments comprise the following steps:
- Obtain camera sensor metadata, such as exposure;
- Perform exposure compensation on video if necessary;
- Encode this compensated sequence;
- Transmit the sensor metadata info to decoder for inverse compensation use; and
- At the decoder side, convert back into the original exposure.

Embodiments of the present invention utilize camera sensor metadata information to perform pre-processing and post-processing for exposure compensation. These embodiments obviate the need to change the codec to enable processing.

6.3 Detailed Embodiments

When using a typical consumer video capturing device, such as a cell phone video camera, the exposure variation affects the quality of coded video. Embodiments of the present invention utilize the camera sensor data to improve the coding efficiency, and improve the quality of coded video.

Figure 11A:
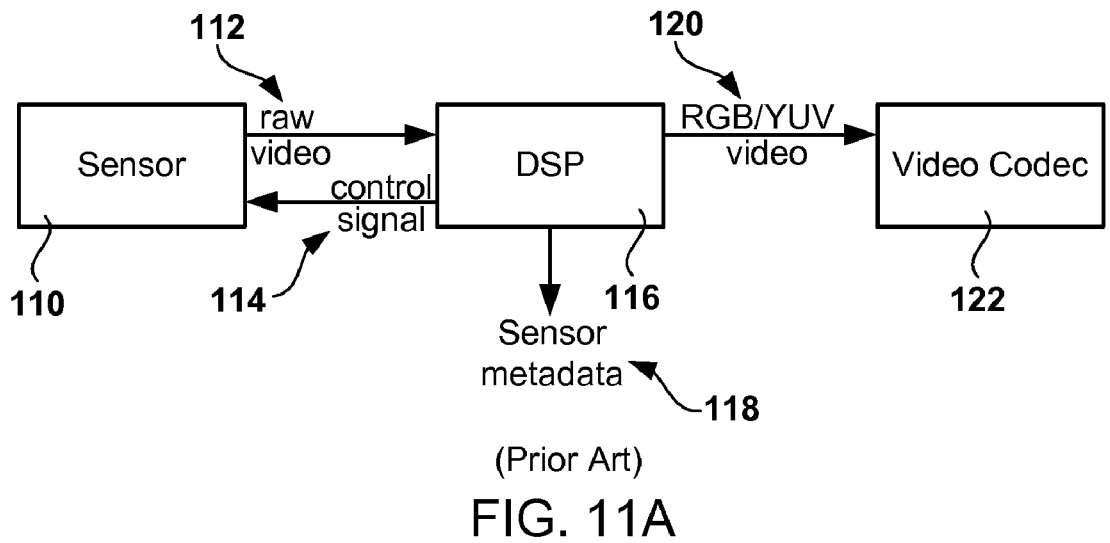
FIG. 11A is a diagram showing a typical video capture device.

As shown in FIG. 11A, a typical video capture device (prior art) comprises a sensor 110, a signal processing unit (DSP) 116, and a video codec 122. The camera sensor 110 captures raw video data 112 and passes it to the DSP 116. The DSP 116 processes the raw video data and outputs 120 the video in RGB, YUV or another format. The DSP may also provide control signals 114 to the sensor 110. Typical functions of the DSP 116 include focus, exposure control, white balance, zoom/pan/tilt, flicker control, etc. Camera sensor metadata 118, comprising exposure (Shutter speed, aperture, and gain), focus, flicker, white balance etc. are available by reading the registers from the DSP 116. These sensor metadata 118 are not used for video coding.

6.3.1 Video Coding System With Exposure Compensation

Figure 11B:
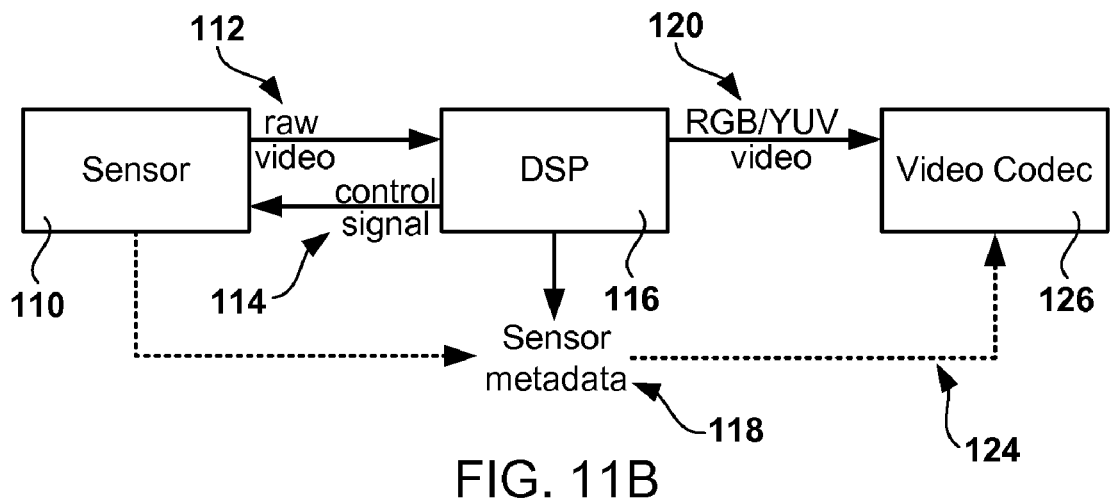
FIG. 11B is a diagram showing an exemplary video capture device with metadata enhancement.

A typical video capture device of the present invention, as shown in FIG. 11B, comprises a sensor 110, a signal processing unit (DSP) 116, and a video codec 122. The camera sensor 110 captures raw video data 112 and passes it to the DSP 116. The DSP 116 processes the raw video data and outputs 120 the video in RGB, YUV or another format. The DSP may also provide control signals 114 to the sensor 110. Typical functions of the DSP 116 include focus, exposure control, white balance, zoom/pan/tilt, flicker control, etc. Camera sensor metadata 118, comprising exposure (Shutter speed, aperture, and gain), focus, flicker, white balance etc. are available by reading the registers from the DSP 116. Camera sensor metadata may alternatively or additionally be obtained directly from the sensor 110. Unlike known devices, these sensor metadata 118 are passed 124 to the video codec 126 for use in video coding.

Figure 12:
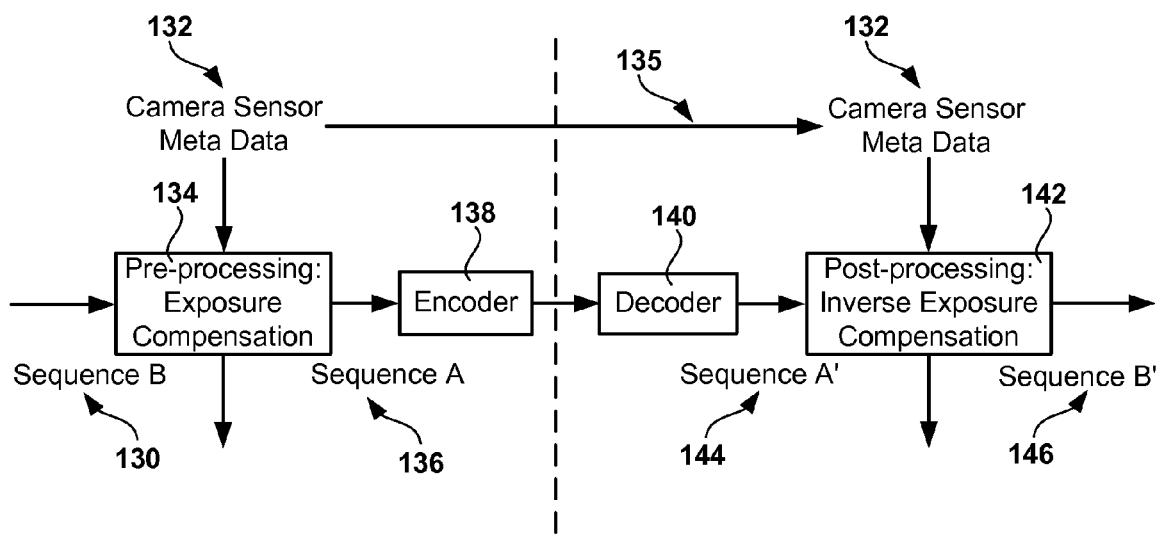
FIG. 12 is a diagram showing an exemplary video coding system with exposure compensation.

Embodiments of the present invention comprise a coding system that utilizes the camera sensor metadata in the video codec to improve the coding efficiency. These embodiments may comprise a simple pre-processing and a post-processing step for exposure compensation. FIG. 12 shows a diagram of an exemplary system. A video sequence, Sequence B 130, is captured with a video sensor and passed to a pre-processing exposure compensation process 134. Sensor metadata is also passed to the exposure compensation process 134. Using the sensor metadata 132, Sequence B is pre-processed to obtain Sequence A 136. Sequence A 136 is sent to an encoder 138 for typical encoding. The encoded Sequence A is then received at a decoder 140 and decoded, thereby creating decoded Sequence A' 144, which may vary from Sequence A due to quantization error or other effects. Sensor metadata 132 is also passed 135 to the decoder side and received at a post-processing inverse exposure compensation process 142, which also receives Sequence A' 144 from the decoder 140. Post-processing inverse exposure compensation process 142 uses the sensor metadata to determine compensation characteristics and performs an inverse exposure compensation, thereby yielding Sequence B' 146.

An exemplary embodiment may be described with following steps:
1. Obtain camera sensor metadata 132, such as exposure;
2. Perform exposure compensation 134 on video if necessary; i.e. Convert a sequence with exposure variation (B) to one with exposure variation A
3. Encode this compensated sequence A 138;
4. Transmit the sensor metadata info 135 to decoder for inverse compensation use;
5. At the decoder side, Convert 142 the coded sequence A' back to original exposure B'

By performing the exposure compensation, we reduce the difference between frames caused by exposure variations. This will reduce the frame prediction error later in the video encoding, and therefore improve the coding efficiency. Note that, in these exemplary embodiments, during step (2) and (4), the exposure compensation is performed in linear space. This means that if the accessible video data is already gamma corrected, it needs to be converted back to linear space first before exposure compensation. After the compensation, we convert it to the usual gamma corrected space for coding or viewing.

A typical gamma conversion and inverse gamma conversion are given by Eq. (21) and (22). The parameters should be known by the camera DSP unit.

$$y_g = 255*(y_l/255)^\gamma \quad (21)$$

$$y_l = 255*(y_g/255)^{1/\gamma} \quad (22)$$

Exposure compensation and inverse exposure compensation can be expressed by Eq. (23) and (24)

$$y_m = y_l * \text{factor} \quad (23)$$

$$y_m = y_l / \text{factor} \quad (24)$$

Here, factor is determined by camera exposure sensor data such as aperture, shutter speed and gain. Proper scaling may be included in the factor to prevent data out of range.

The goal of exposure compensation is to adjust the captured luminance as if both frames were captured by the same reference exposure, i.e. same aperture, shutter speed and gain. According to the theory of optics, the captured luminance by a sensor is proportional to the shutter speed, inverse proportional to the square of aperture (in the unit of fstop), and proportional to gain. Therefore the factor can be expressed as:

$$\text{factor} = (\text{shutter\_speed}_{ref}/\text{shutter\_speed})*(\text{fstop}^2/\text{fstop}_{ref}^2)*(\text{gain}_{ref}/\text{gain})$$

Here the factor is simply determined by the camera sensor metadata, no power-consuming frame matching algorithm is required. Of course, under the same principle, more complex pre-processing algorithms can also be used to improve the pre-processing and reduce the prediction error during coding.

To reconstruct the image sequence, we transmit 135 the camera meta-data from the encoder 138 to the decoder 140. Some embodiments may employ several mechanisms for accomplishing this. In one realization, the exposure and other camera meta-data values are transmitted as user data within a bit-stream. In a second realization, the exposure and other camera meta-data are transmitted implicitly with tone mapping curves. These curves are constructed at the encoder and instruct the decoder how to map decoded intensity values to output intensity values. The tone mapping curves are then transmitted to the decoder. In one realization, the tone mapping SEI message, as defined in the H.264/AVC standard, is employed.

7. Weighted Prediction Embodiments

7.1 Introduction

Weighted prediction has two significant drawbacks for mobile applications: (1) it is not currently allowed in the video coding profiles typically employed for mobile encoding and (2) the computational load for exploiting weighted prediction is typically high, due to the fact that state-of-the-art approaches perform multi-pass encoding and compare the rate-distortion (RD) cost of weighted prediction against the non-weighted prediction. This multi-pass encoding requires additional processing power, increased memory bandwidth, and higher power consumption.

These embodiments of the present invention are adapted to a scenario wherein weighted prediction is allowed by the video codec. In this case, the major challenge for mobile acquisition is the increased processing required to exploit the weighted prediction functionality. These embodiments comprise an efficient method for determining weighted prediction parameters. These methods may utilize camera sensor metadata to determine the parameters. It should be understood, that some of these methods do not require a change in video coding systems that support weighted prediction coding.

These embodiments of the present invention comprise methods and systems for the efficient selection of weighted prediction parameters through the use of camera metadata. The methods benefit scenarios that experience variations in video brightness due to camera exposure change. An exemplary method comprises the following steps:

(a) obtain camera sensor metadata;
(b) if the camera exposure value changes between frames and exceeds a threshold, enable the weighted prediction coding tools, and
(c) determine the weighted prediction parameters from the camera metadata.

Unlike prior art methods, these embodiments utilize camera sensor metadata information to enable and control the weighted prediction process.

7.2 Exemplary Embodiments

The process of weighted prediction operates on the values used to predict a current frame from a reference frame. Weighted prediction may be realized by applying a multiplicative weighting factor and an additive offset to the reference frame prior to motion compensation. The goal is to reduce the motion compensated prediction error between the current and reference frames, and it is expressed as $$p_{pred}(x) = w * p_{ref}(x') + o \quad (25)$$

where $p_{pred}(x)$ is the predicted pixel at the coordinate x in the current picture, $p_{ref}(x')$ is the pixel at the motion compensated position x' in the reference picture, and w and o are the weighting factor and offset, respectively. Selection of these parameters is accomplished at the encoder, which must determine whether to use weighted prediction or not. It must also determine the weighting parameters.

These embodiments comprise a weighted prediction estimation method that uses camera sensor metadata. This addresses the problem of video brightness variations caused by camera exposure changes, which is one of the cases where weighted prediction is useful during mobile acquisition.

We begin by establishing a model of how the brightness value of the acquired image is related to the exposure value of a camera. The exposure value of a camera is controlled by a combination of shutter speed and lens aperture. Shutter speed controls how long the sensor is exposed to light, while the lens aperture controls how much of the light passes through a lens. The brightness value (BV) of an acquired image is proportional to the amount of light that the sensor is exposed to, and therefore is proportional to the camera exposure value. Other factors that can affect the brightness value of the final acquired image include gain and gamma correction. As an example, we can model the brightness value (BV) as a combination of shutter speed, gain, aperture (in the unit of f-stop) and gamma ($\lambda$). This model is expressed as Eq. (26). If a camera has other image processing units or restrictions that can affect the acquired image brightness, those may be taken into account in the model also. In general, this metadata is known from the camera, and it can be used to monitor brightness value changes and also to control weighted prediction in the encoder.

$$BV \propto (\text{shutter\_speed} * \text{gain}/\text{fstop}^2)^\lambda \quad (26)$$

Weighting parameters can be determined from the ratio of the brightness values of the current frame and the reference frame.

$$\text{weight} = BV_{curr}/BV_{ref} \text{ and offset} = 0 \quad (27)$$

In these embodiments, a fast weighted prediction algorithm works as follows:

Obtain camera sensor metadata (exposure etc.) of the reference and the current frames Calculate the change of brightness values as in Eq. (26)

If the change of brightness value exceeds a threshold, make the encoder choose weighted prediction.

Determine weighting parameters from the exposure values as in Eq. (27)

The terms and expressions which have been employed in the foregoing specification are used therein as terms of description and not of limitation, and there is no intention in the use of such terms and expressions of excluding equivalence of the features shown and described or portions thereof.

What is claimed is:

1. A method for generating an enhanced dynamic range (EDR) image frame from a low dynamic range (LDR) image frame and a plurality of enhancement frames, said method comprising:
   a) computing a Laplacian pyramid for each of said enhancement frames and said LDR image frame, each said Laplacian pyramid computed based on an adaptive Gaussian pyramid;
   b) computing blend pyramids corresponding to said enhancement frame pyramids, said blend pyramids denoting how pixels in said enhancement frame pyramids are to be used in a pyramid blending process, said blend pyramids computed by: (i) computing initial blend pyramids using temporal weights respectively assigned to said enhancement frames; and (ii) modifying said initial blend pyramids using maps of mis-match values between pixels of said enhancement frames and respective reference frames; and
   c) performing pixel-wise maximization between said Laplacian pyramids according to said blend pyramids, thereby creating a blended pyramid.

2. A method as described in claim 1 wherein said blend pyramids comprise weighting factors that define a relative contribution of pixels in said enhancement frame pyramids during said performing.

3. A method as described in claim 1 further comprising assigning temporal weight values to said enhancement frame pyramids.

4. A method as described in claim 1 further comprising performing a binary thresholding operation on said blend pyramids.

5. A method as described in claim 1 further comprising performing a smoothing operation on said blend pyramids.

* * * * *

UNITED STATES PATENT AND TRADEMARK OFFICE
CERTIFICATE OF CORRECTION

PATENT NO. : 8,406,569 B2  
APPLICATION NO. : 12/356074  
DATED : March 26, 2013  
INVENTOR(S) : Christopher A. Segall et al.

Page 1 of 1

It is certified that error appears in the above-identified patent and that said Letters Patent is hereby corrected as shown below:

Col. 8, Line 21

Change: " $m_{i,j,k} = \{p_{i,j,k} < \hat{p}\} \text{ and } \{\epsilon_{i,j,k}{}^1 > \hat{\epsilon}_k\} \text{ and } \{\epsilon_{i,j,k}{}^2 > \hat{\epsilon}_k\}$ "

to read: -- $m_{i,j,k} = \{\rho_{i,j,k} < \hat{\rho}\} \text{ and } \{\mathcal{E}^1_{i,j,k} > \hat{\mathcal{E}}_k\} \text{ and } \{\mathcal{E}^2_{i,j,k} > \hat{\mathcal{E}}_k\}$ --.

Signed and Sealed this  
Thirteenth Day of August, 2013

Teresa Stanek Rea  
*Acting Director of the United States Patent and Trademark Office*